United States Patent
Sarata et al.

(10) Patent No.: US 8,530,102 B2
(45) Date of Patent: Sep. 10, 2013

(54) HYDROGEN GENERATOR

(75) Inventors: Takafumi Sarata, Chiba (JP); Norimasa Yanase, Chiba (JP); Toru Ozaki, Chiba (JP); Tsuneaki Tamachi, Chiba (JP); Kazutaka Yuzurihara, Chiba (JP); Fumiharu Iwasaki, Chiba (JP)

(73) Assignee: Seiko Instruments Inc. (JP)

( * ) Notice: Subject to any disclaimer, the term of this patent is extended or adjusted under 35 U.S.C. 154(b) by 181 days.

(21) Appl. No.: 12/930,740

(22) Filed: Jan. 14, 2011

(65) Prior Publication Data

US 2011/0212373 A1 Sep. 1, 2011

Related U.S. Application Data

(63) Continuation of application No. 11/909,697, filed as application No. PCT/JP2006/306030 on Mar. 24, 2006, now Pat. No. 7,901,818.

(30) Foreign Application Priority Data

Mar. 25, 2005 (JP) .................................. 2005-089018
Sep. 29, 2005 (JP) .................................. 2005-284151

(51) Int. Cl.
*H01M 8/06* (2006.01)
*B01J 7/00* (2006.01)

(52) U.S. Cl.
USPC ................................ 429/421; 48/61; 429/444

(58) Field of Classification Search
USPC ...................... 429/421, 444; 48/61; 423/657
See application file for complete search history.

(56) References Cited

U.S. PATENT DOCUMENTS 7,901,818 B2 * 3/2011 Sarata et al. .................. 429/421

FOREIGN PATENT DOCUMENTS

WO 2005005311 1/2005

* cited by examiner

*Primary Examiner* — Wayne Langel
(74) *Attorney, Agent, or Firm* — Adams & Wilks

(57) ABSTRACT

A hydrogen generator has a reaction chamber that contains a complex hydride capable of reacting with an aqueous acid solution to generate hydrogen. A storage chamber contains an aqueous acid solution that is supplied through a supply pipe to the reaction chamber to react with the complex hydride to generate hydrogen. The total weight of water contained in the aqueous acid solution is 0.2 times or more, but 3 times or less, than the weight of the complex hydride. A control device controls the supplying of the aqueous acid solution through the supply pipe to the reaction chamber based on a reference pressure such that the aqueous acid solution is repeatedly supplied to the reaction chamber when the reference pressure is greater than the internal pressure within the reaction chamber and not supplied to the reaction chamber when the reference pressure is less than the reaction chamber internal pressure.

18 Claims, 18 Drawing Sheets

FIG. 7

| No. | Aqueous accelerator solution | Amount of accelerator (g)* | Accelerator accommodated in reaction section | Amount of accelerator (g)* | Total amount of accelerator (g)* | Reaction efficiency |
|---|---|---|---|---|---|---|
| (1) | Aqueous solution of 25 wt.% malic acid | 7.8 | None | 0 | 7.8 | 87% |
| (2) | Aqueous solution of 10 wt.% nickel chloride | 2.6 | None | 0 | 2.6 | 91% |
| (3) | Aqueous solution of 15 wt.% malic acid + 5 wt.% nickel chloride | 5.3 | None | 0 | 5.3 | 94% |
| (4) | Aqueous solution of 10 wt.% nickel chloride | 2.6 | Solid nickel chloride | 0.3 | 2.9 | 96% |
| (5) | Ditto | 2.6 | Solid cobalt chloride | 0.3 | 2.9 | 96% |
| (6) | Ditto | 2.6 | Solid malic acid | 0.5 | 3.1 | 94% |
| (7) | Aqueous solution of 20 wt.% malic acid | 5.8 | Solid malic acid | 0.5 | 6.3 | 91% |
| (8) | Ditto | 5.8 | Solid cobalt chloride | 0.3 | 6.1 | 92% |
| (9) | Ditto | 5.8 | Palladium | 0.3 | 6.1 | 89% |
| (10) | Aqueous solution of 15 wt.% malic acid + 5 wt.% nickel chloride | 5.3 | Solid nickel chloride | 0.3 | 5.6 | 97% |

*Amount of accelerator with respect to 10 g of sodium borohydride

HYDROGEN GENERATOR

CROSS REFERENCE TO RELATED APPLICATIONS

This application is a continuation of application Ser. No. 11/909,697 filed Sep. 25, 2007, now U.S. Pat. No. 7,901,818 which is a U.S. national stage of International Application No. PCT/JP2006/306030 filed Mar. 24, 2006 claiming priority dates of Mar. 25 and Sep. 29, 2005 and published in a non-English language, which applications are hereby incorporated by reference.

BACKGROUND OF THE INVENTION

TECHNICAL FIELD

This invention relates to a hydrogen generator for efficiently supplying hydrogen to a device requiring hydrogen, such as a fuel cell or a hydrogen engine, or a hydrogen storage container.

BACKGROUND ART

As energy problems and environmental problems have attracted increasing attention in recent years, expectations are growing that hydrogen, which is a fuel other than a fossil fuel, will serve as a clean-emission fuel. However, hydrogen poses problems in all aspects; such as production, storage, transportation, and technologies for utilization, and the development of a technique for handling it is an urgent task.

As a power generator utilizing hydrogen, a fuel cell and an internal combustion engine (hereinafter referred to as a hydrogen engine) are named. These power generators are targeted for all business categories, including district-distributed power supplies, buildings, households, automobiles, and portable instruments. In any such cases, a predetermined amount of hydrogen needs to be supplied promptly. The automobiles and portable instruments, in particular, need a space for installation of a power generator, and require efficient supply of generated power to a device which consumes electric power. Thus, hydrogen supply instruments and hydrogen generation materials are required to have a high hydrogen storage density, and to be capable of generating hydrogen with low energy.

A method of hydrolyzing a complex hydride, called a chemical hydride, has so far been known as a method for obtaining hydrogen with low energy. For example, there have been known a method which comprises dissolving lithium borohydride, sodium borohydride, lithium aluminum hydride, or sodium aluminum hydride, any of which is a type of complex hydride, in an aqueous alkaline solution, and supplying the resulting aqueous solution to a precious metal catalyst for their contact, thereby causing a hydrogen generation reaction; and a method by which water or alcohol is supplied to a complex hydride to cause a hydrogen generation reaction (see, for example, Patent Document 1).

In this case, the reactants of the hydrogen generation reaction are the complex hydride and water, and the catalyst has the effect of an accelerator for accelerating the hydrogen generation reaction.

PATENT DOCUMENT 1

Japanese Unexamined Patent Publication No. 2003-206101 (pages 4 to 6, FIG. 1)

DISCLOSURE OF THE INVENTION

Problems to be Solved by the Invention

However, when the complex hydride is dissolved in the aqueous alkaline solution to cause reaction, as before, the probability of contact between the complex hydride and the precious metal catalyst changes over time, posing problems such that the supply of the aqueous alkaline solution of the complex hydride is complicated to control, control of the hydrogen generation reaction is difficult, and the amount of hydrogen generation based on the total weight of the complex hydride (hereinafter referred to as the reaction efficiency) is small. This is because if the concentration of the aqueous solution of sodium borohydride exceeds 12% by weight, sodium metaborate as the product is hydrated and precipitated, thus making it difficult to bring sodium borohydride into contact with the catalyst uniformly with high efficiency.

According to the method of supplying water or alcohol to the complex hydride, on the other hand, the reaction rate is so low that it is difficult to obtain hydrogen at a rate necessary for the power generator. With this method, an increase in the amount of water or alcohol supplied can accelerate the reaction rate. However, the amount of the complex hydride with respect to water or alcohol becomes extremely small. Thus, the problem arises that the amount of hydrogen generation based on the weight of all reactants (hereinafter referred to as the hydrogen storage density) is decreased.

SUMMARY OF THE INVENTION

The present invention has been accomplished in the light of the above-described situations. It is an object of the invention to provide a hydrogen generator which permits uniform and efficient contact between a complex hydride and a catalyst, can generate hydrogen at a required rate, and imparts a high reaction efficiency and a high hydrogen storage density.

Means for Solving the Problems

A hydrogen generator according to the present invention, for attaining the above object, is a hydrogen generator in which a reacting aqueous solution (aqueous reagent solution), used for a hydrogen generation reaction, is supplied to a complex hydride to generate hydrogen, comprising: a supply section for supplying the reacting aqueous solution such that a total weight of water contained in reacting aqueous solution supplied to the complex hydride is 0.2 times or more, but 3 times or less, a weight of the complex hydride.

A hydrogen generator of the present invention, for attaining the above object, is a hydrogen generator in which a reacting aqueous solution, used for a hydrogen generation reaction, is supplied to a complex hydride to generate hydrogen, wherein a metal chloride is contained in the reacting aqueous solution, and a concentration of the metal chloride is 0.1% by weight or more, but 40% by weight or less.

By so doing, in the hydrogen generation reaction in which the complex hydride and water are reacted, the reacting aqueous solution is supplied to the complex hydride. Thus, the reaction rate can be increased, despite a small amount of water. Moreover, uniform contact of the reacting aqueous solution with the complex hydride can be made.

A hydrogen generator according to the present invention, for attaining the above object, is a hydrogen generator in which a reacting aqueous solution, used for a hydrogen generation reaction, is supplied to a complex hydride to generate hydrogen, wherein a pH of the reacting aqueous solution is 1 or higher, but 3 or lower. Moreover, the pH of the reacting aqueous solution is preferably 1.4 or higher, but 2 or lower.

A hydrogen generator according to another aspect of the present invention is one wherein the total weight of the water in the reacting aqueous solution is 1.0 times or more, but 3 times or less.

By so doing, in the hydrogen generation reaction in which the complex hydride and water are reacted, the reacting aqueous solution can be supplied, together with the accelerator, to the complex hydride. As a result, when the complex hydride and water are reacted, the accelerator is always supplied to the reaction section. Thus, the reaction rate can be increased, despite a small amount of water. Moreover, the probability of contact between the complex hydride and the accelerator does not change, and uniform contact can be made. Consequently, the water-soluble accelerator is uniformly dispersed in the aqueous solution, thus making it possible to achieve a constant probability of contact between the complex hydride and the accelerator.

Furthermore, 9% by weight of hydrogen is obtained based on the weight of the reacting aqueous solution and the complex hydride, and a high hydrogen storage density is achieved. Under highly acidic conditions, the volume or weight of the aqueous solution of the acid is great. However, the reaction efficiency is improved, with the result that it becomes possible to increase the hydrogen storage density per volume or per weight.

A hydrogen generator according to another aspect of the present invention is one wherein a metal chloride is contained in the reacting aqueous solution, and a concentration of the metal chloride is 0.1% by weight or more, but 25% by weight or less. Preferably, the concentration of the metal chloride is 1% by weight or more, but 15% by weight or less.

A hydrogen generator according to another aspect of the present invention is one wherein a pH of the reacting aqueous solution is 1 or higher, but 3 or lower.

A hydrogen generator according to another aspect of the present invention is one wherein the concentration of the metal chloride is 0.1% by weight or more, but 25% by weight or less.

A hydrogen generator according to another aspect of the present invention is one wherein a metal chloride is contained in the reacting aqueous solution, and a concentration of the metal chloride is 0.1% by weight or more, but 25% by weight or less.

A hydrogen generator according to another aspect of the present invention is one wherein the complex hydride is a boron hydride salt.

A hydrogen generator according to another aspect of the present invention is one wherein a carboxylic acid is contained in the reacting aqueous solution.

The carboxylic acid is preferably at least one of those included in a group consisting of citric acid, malic acid, succinic acid, tartaric acid, malonic acid, oxalic acid, and maleic acid. These acids are not volatile, and can prepare a stable aqueous acid solution.

A hydrogen generator according to another aspect of the present invention is one wherein an anti-foaming agent is contained in at least one of the reacting aqueous solution and the complex hydride. The hydrogen generator according to a further aspect is characterized in that a complex hydride anti-foaming agent is contained.

Because of this feature, contact between the complex hydride and the reacting aqueous solution is easily made. That is, when the reacting aqueous solution is supplied to the complex hydride, particularly in the case of a high ratio of the boron hydride salt, the amount of water decreases immediately after the reaction, and the viscosity of the product is very high. As a result, foams engulfing hydrogen, the complex hydride, and the product occur in large amounts, but are apt to disappear because of the effect of the anti-foaming agent. Consequently, it becomes possible to suppress the inhibition, due to the foams, of contact between the reacting aqueous solution and the complex hydride, and curtail decreases in the reaction rate and the reaction efficiency. Since the outflow of foams can be suppressed by anti-foaming, moreover, the volume of the reactor storing the complex hydride can be reduced to increase the hydrogen storage density.

A hydrogen generator according to another aspect of the present invention is one wherein the reacting aqueous solution supplied to the complex hydride is brought into contact with a solid accelerator for a hydrogen generation reaction.

A hydrogen generator according to another aspect of the present invention is one wherein the solid accelerator contains the same type of accelerator as the accelerator contained in the reacting aqueous solution.

Even when the reacting aqueous solution and the complex hydride are mixed, not all of the reactants react immediately. Thus, a mixed aqueous solution comprising a mixture of the reactants and the resulting product is first formed. Since this aqueous solution contains the complex hydride, it causes a hydrogen generation reaction. The reaction rate is slowed compared with that immediately after supply of the reacting aqueous solution. Hence, contact with a solid accelerator held in a solid form can result in an increased reaction rate. It does not matter whether the type of the accelerator in the reacting aqueous solution, and the type of the solid accelerator are identical or different.

A hydrogen generator according to another aspect of the present invention is one wherein the solid accelerator is a precious metal or a hydrogen absorbing alloy.

Iridium, osmium, palladium, ruthenium, rhodium, platinum, and gold can be used as the precious metal. The precious metal and the hydrogen absorbing alloy show a catalytic action involved in the hydrolysis reaction of the complex hydride. Thus, contact of the precious metal or the hydrogen absorbing alloy with the mixed aqueous solution can increase the reaction rate. Such a meta- or alloy-based catalyst does not dissolve in the mixed solution. Thus, the catalyst shows a constant catalytic effect regardless of the liquid nature of the mixed solution, and can stably generate hydrogen.

A hydrogen generator according to another aspect of the present invention is one wherein the complex hydride and the solid accelerator are disposed in a mixed form.

A hydrogen generator according to another aspect of the present invention is one wherein the reacting aqueous solution is stored in an aqueous solution storage section, the complex hydride is stored in a hydrogen supply section comprising a reaction section for causing a hydrogen reaction, a supply pipe leading to an external device is connected to the hydrogen $su_{pp}l_y$ section, and the reacting aqueous solution from the aqueous solution storage section is supplied to the complex hydride by the hydrogen supply section.

By so doing, the initiation and termination of the hydrogen generation reaction can be controlled by supplying the reacting aqueous solution and stopping the supply of the reacting aqueous solution. This facilitates reaction control.

A hydrogen generator according to another aspect of the present invention is one wherein the hydrogen supply section has a function of performing a first step in which a value obtained by adding a pressure lost in the supply pipe to a set hydrogen pressure in the external device is taken as a reference pressure, and when an internal pressure of the external device is lower than the set hydrogen pressure, and when an internal pressure of the reaction section is lower than the reference pressure, the reacting aqueous solution is supplied to the complex hydride; a function of performing a second step in which hydrogen is generated, with the complex hydride being dissolved in the reacting aqueous solution; and a function of performing a third step in which when a pressure of hydrogen supply from the reaction section to the external device is higher than the reference pressure, the supply of the reacting aqueous solution is stopped, and the first step to the third step are performed repeatedly sequentially in the hydrogen supply section.

Because of these features, when hydrogen is consumed in the external device, hydrogen can be generated and supplied in synchronization with the rate of consumption. The hydrogen generation reaction occurs upon supply of the reacting aqueous solution to the complex hydride. The amount of hydrogen generated during this reaction is determined by the amount of water contained in the reacting aqueous solution. Thus, when the reacting aqueous solution is supplied, or its supply is stopped, in accordance with the difference between the internal pressure of the reaction section and the reference pressure, the amount of hydrogen necessary for its consumption in the external device is supplied intermittently, so that the amount of hydrogen supply can be controlled easily.

A hydrogen generator according to another aspect of the present invention is one wherein after supplying the reacting aqueous solution to the complex hydride, the hydrogen supply section supplies the reacting aqueous solution such that a rate of hydrogen generation exceeds a rate of hydrogen consumption in the external device at least once.

By so doing, the internal pressure of the reaction section and the external device can be increased, and the flow of a series of steps, ranging from the first step to the third step, can be performed repeatedly. The amount of supply of the reacting aqueous solution is determined by the status of the increase in the internal pressure. Thus, if the hydrogen generation reaction occurs promptly, the amount of supply is small. If the complex hydride is covered with the product to delay contact between the reacting aqueous solution and the complex hydride, or if the temperature of the reaction section is low, the rate of the hydrogen generation reaction lowers, thus making it necessary to increase the amount of supply of the reacting aqueous solution, thereby raising the speed of hydrogen generation.

A hydrogen generator according to another aspect of the present invention is one wherein the hydrogen supply section supplies the reacting aqueous solution such that the internal pressure of the reaction section becomes higher than the reference pressure by 0.3 kPa to 300 kPa.

Because of this feature, the internal pressure of the reaction section is not excessive, so that operation can be performed safely.

A hydrogen generator according to another aspect of the present invention is one wherein an amount of supply of reacting aqueous solution in the first step is set in the hydrogen supply section such that a theoretical hydrogen pressure obtained by dividing a stoichiometric amount of generation of hydrogen, which is generated upon reaction between the water contained in the reacting aqueous solution and the complex hydride, by a capacity of the hydrogen supply section is 5 kPa to 300 kPa.

By so doing, an excessive rise in the pressure inside the hydrogen supply section can be suppressed, and a safe operation can be performed.

A hydrogen generator according to another aspect of the present invention is one wherein the external device is a fuel cell, and a supply pipe is connected to a negative electrode chamber of the fuel cell.

Because of this feature, the difference between the pressures imposed by the positive and negative electrode chambers on an electrolyte present between the positive and negative electrode chambers is within the range of 0.305 MPa to 0.6 MPa at the greatest. If a pressure corresponding to the amount of hydrogen consumed by the fuel cell is subtracted from this pressure difference, stress imposed on the electrolyte can be reduced to less than the durability of the electrolyte.

A hydrogen generator according to another aspect of the present invention is one wherein a set hydrogen pressure of the fuel cell connected is not lower than a pressure of a positive electrode chamber of the fuel cell, but is not higher than a pressure which is higher than the pressure of the positive electrode chamber by 0.3MPa.

A hydrogen generator according to another aspect of the present invention is one having a conduit connecting the aqueous solution storage section and the reaction section, and a check valve as a control device provided in the conduit and opening and closing under a differential pressure between the aqueous solution storage section and the reaction solution, the check valve opening when the internal pressure of the reaction section becomes lower than the reference pressure, to permit flow of the reacting aqueous solution toward the reaction section, and the check valve closing when the internal pressure of the reaction section becomes higher than the reference pressure, to stop the flow of the reacting aqueous solution toward the reaction section.

Because of the above features, there is no need for an electrical method of detection and control, which comprises converting pressure into an electrical signal with the use of a pressure sensor, and supplying the reacting aqueous solution. In other words, according to the check valve, a change in force associated with the difference between the internal pressure of the reaction section and the reference pressure is detected by the valve body of the check valve, whereby the valve can be opened and closed automatically. In this manner, the reacting aqueous solution can be supplied, and its supply can be stopped, in accordance with the difference between the reference pressure exerted on the reacting aqueous solution and the internal pressure of the reaction section.

A hydrogen generator according to another aspect of the present invention is one having a conduit connecting the aqueous solution storage section and the reaction solution, and a regulator as a control device provided in the conduit, the regulator opening when the internal pressure of the reaction section becomes lower than the reference pressure, to permit flow of the reacting aqueous solution toward the reaction section, and the regulator closing when the internal pressure of the reaction section becomes higher than the reference pressure, to stop the flow of the reacting aqueous solution toward the reaction section.

A fuel cell apparatus can be constructed by connecting the hydrogen supply section of the hydrogen generator to a negative electrode chamber of a fuel cell, the negative electrode chamber being supplied with hydrogen generated.

According to this feature, it becomes possible to provide a fuel cell apparatus equipped with a hydrogen generator which can increase the rate of hydrogen generation, which can heighten the reaction efficiency and the hydrogen storage density, and which is easy to control.

Effects of the Invention

In the present invention, the reacting aqueous solution is supplied to the complex hydride, whereby water as the reactant for the hydrogen generation reaction and the accelerator for raising the reaction rate can be simultaneously supplied to the complex hydride. As a result, it becomes possible to provide a hydrogen generator which enables the accelerator and the complex hydride to be brought into contact uniformly and efficiently, which can increase the rate of hydrogen generation, which can render the reaction efficiency and the hydrogen storage density high, and which is easy to control.

BRIEF DESCRIPTION OF THE DRAWINGS

[FIG. 7] A view, in tabular form, illustrating aqueous accelerator solutions which are reacting aqueous solutions, and combinations of an accelerator and a solid accelerator.

DESCRIPTION OF THE NUMERALS AND SYMBOLS

Figure 1:
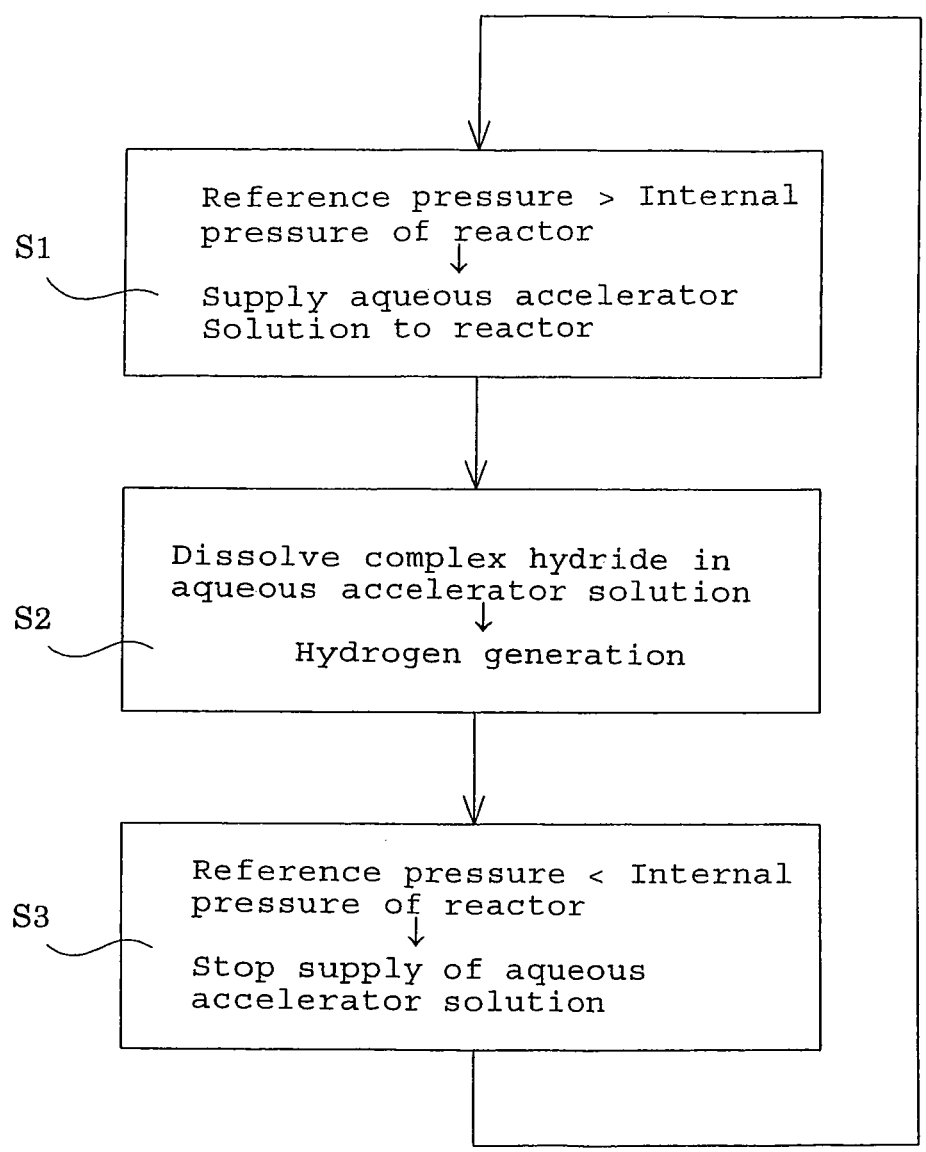
[FIG. 1] A process flow chart of a hydrogen generation method by a hydrogen generator according to an embodiment of the present invention.

1 Reaction section
2 Aqueous solution storage section
3 Connecting pipe
4 Check valve
5 Air inlet
6 Anode chamber of fuel cell
7 Hydrogen supply pipe
S1 First step
S2 Second step
S3 Third step

DETAILED DESCRIPTION OF THE INVENTION

Embodiments of the present invention will now be described in detail based on the accompanying drawings.

FIG. 1 shows the process flow of a hydrogen generation method by a hydrogen generator according to an embodiment of the present invention.

As shown in the drawing, the first step S1 is the step of detecting that the internal pressure of a reactor is lower than a reference pressure, and supplying an aqueous accelerator solution as a reacting aqueous solution to the reactor. The second step S2 is the step of dissolving a complex hydride in the aqueous accelerator solution to cause a hydrogen generation reaction. The third step S3 is the step of detecting that the internal pressure of the reactor is higher than the reference pressure, and stopping the supply of the aqueous accelerator solution. By repeating the flow from the first step S1 to the third step S3, hydrogen can continue to be supplied. In the present embodiment, malic acid was used as the accelerator of the aqueous accelerator solution, and sodium borohydride was used as the complex hydride.

Figure 2:
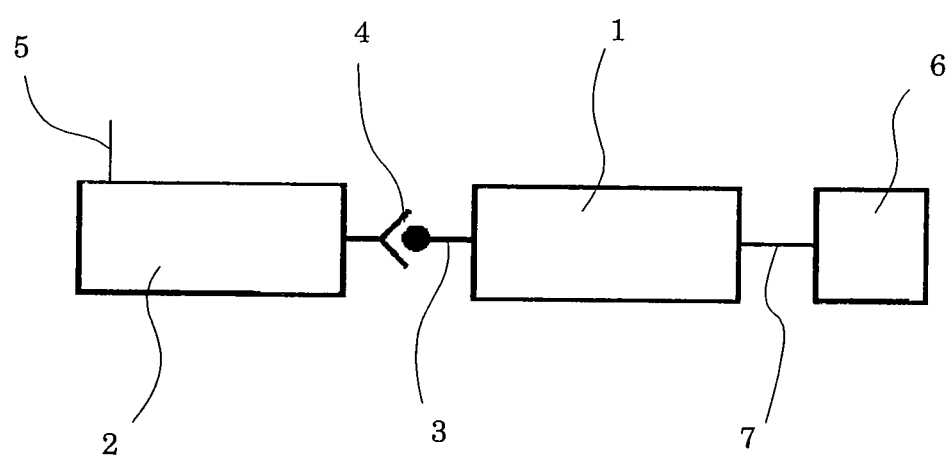
[FIG. 2] A schematic configuration drawing of a fuel cell apparatus equipped with a hydrogen generator according to the embodiment of the present invention.

FIG. 2 shows the schematic configuration of a fuel cell apparatus equipped with a hydrogen generator according to the embodiment of the present invention.

As shown in the drawing, a hydrogen supply instrument comprises a hydrogen reaction section (reaction section) 1 which accommodates sodium borohydride as a complex hydride and causes a hydrogen generation reaction, and an aqueous solution storage section 2 which stores an aqueous solution of malic acid as an aqueous accelerator solution which is a reacting aqueous solution. The reaction section 1 and the aqueous solution storage section 2 are connected by a connecting pipe 3. The connecting pipe 3 is provided with a check valve 4 as a valve, and the aqueous solution storage section 2 is provided with an air inlet 5 for taking the air into the aqueous solution storage section 2. Further, the reaction section 1 is connected to an anode chamber 6, which is a negative electrode chamber of a fuel cell, by a hydrogen supply pipe 7, and hydrogen is supplied from the reaction section 1 to the anode chamber 6. The fuel cell is a polymer electrolyte fuel cell, and has a structure in which hydrogen supplied to the anode chamber 6 is not released to the outside.

Control over the supply of the aqueous malic acid solution to the reaction section 1, and over the stoppage of its supply is exercised based on FIG. 1. As a set hydrogen pressure for actuating the fuel cell, the internal pressure of the anode chamber 6 was set at atmospheric pressure. This is because the solid polymer membrane sandwiched between the anode and the cathode is subjected to atmospheric pressure from the cathode side, and is also subject to the internal pressure of the anode chamber 6 from the anode side, so that the pressure difference between both pressures is decreased to keep the stress on the solid polymer membrane low. The reference pressure is a value obtained by adding a pressure, which is lost by the hydrogen supply pipe 7, to the set hydrogen pressure. In the present embodiment, however, the hydrogen supply pipe 7 is sufficiently thick and short. Thus, no pressure loss occurs, and the reference pressure is atmospheric pressure equal to the set hydrogen pressure.

The aqueous solution storage section 2 is always under atmospheric pressure because of the air flowing in through the air inlet 5. The valve opening pressure of the check valve 4 is nearly equal to 0 Pa, and no pressure loss occurs during the passage of the aqueous malic acid solution through the connecting pipe 3. Thus, the supply of the aqueous malic acid solution, and the stoppage of its supply are determined by the difference between the internal pressure of the reaction section 1 and atmospheric pressure. Control over the supply of the aqueous malic acid solution, and the stoppage of the supply is exercised as in the process flow chart shown in FIG. 1, and its details will be offered below.

The first step S1 is the step of performing the following actions: Upon hydrogen consumption associated with the power generation of the fuel cell, the internal pressure of the anode chamber 6 and the internal pressure of the reaction section 1 are lowered. If the internal pressure of the reaction section 1 is lower than atmospheric pressure, a force in the liquid feed direction acts on the valve body of the check valve 4 under the differential pressure between the reaction section 1 and the aqueous solution storage section 2, with the result that the check valve 4 opens to supply the aqueous malic acid solution to the reaction section 1.

The second step S2 is the step of causing a hydrogen generation reaction. When the aqueous malic acid solution is supplied to the reaction section 1, sodium borohydride and the aqueous malic acid solution are brought into contact, whereby the sodium borohydride dissolves in the aqueous malic acid solution. In the aqueous malic acid solution, the sodium borohydride associates with water, which is the solvent, to cause a hydrogen generation reaction. On this occasion, dissolved malic acid works as a catalyst in a homogeneous system, showing the action of accelerating the reaction between sodium borohydride and water.

The third step S3 is a step of the following mechanism: When the internal pressure of the reaction section 1 exceeds atmospheric pressure because of hydrogen generation, a force in a direction opposite to the liquid feeding direction acts on the valve body of the check valve 4 under the differential pressure between the reaction section 1 and the aqueous solution storage section 2 to close the check valve 4, thereby stopping the supply of the aqueous malic acid solution.

By repeating the above-described steps, hydrogen can be supplied to the anode chamber 6, and hydrogen in an amount conformed to the output current of the fuel cell can be supplied. Since the check valve 4 is opened and closed in accordance with the pressure to feed the aqueous malic acid solution, no electric power is required for liquid feed control.

During stoppage of power generation by the fuel cell, there is no hydrogen consumption, and the reaction section 1 is kept at a constant pressure. Thus, the aqueous malic acid solution is not supplied to the reaction section 1, and fresh hydrogen does not occur anymore. That is, the supply of hydrogen can be stopped simultaneously with the stoppage of operation of the fuel cell.

Figure 3:
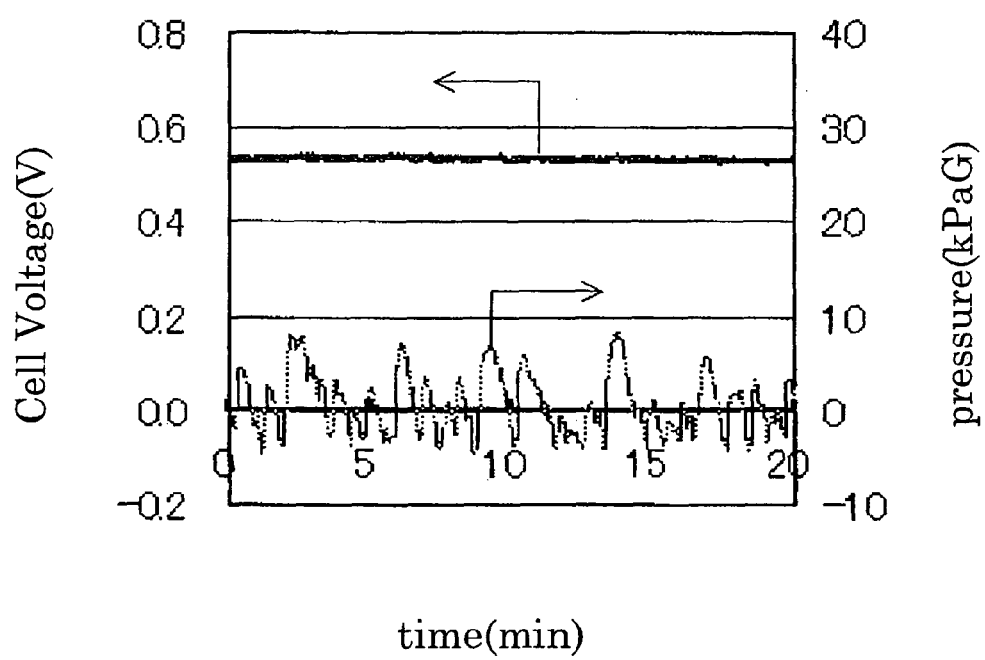
[FIG. 3] A graph showing changes in the internal pressure of a hydrogen supply instrument and changes over time in the output voltage of a fuel cell when the hydrogen supply instrument and the fuel cell were operated using the hydrogen generator according to the present invention.

FIG. 3 is a graph showing changes in the internal pressure of the hydrogen supply instrument and changes over time in the output voltage of the fuel cell when the hydrogen supply instrument and the fuel cell were operated using the hydrogen generator according to the present invention. The concentration of the aqueous malic acid solution was set at 25% by weight, and a silicone-based anti-foaming agent was incorporated. The ratio of water in the aqueous malic acid solution to sodium borohydride was set at 1.3.

The graph of FIG. 3 shows that a drop in the internal pressure of the reaction section 1 due to power generation of the fuel cell, and a rise in the internal pressure of the reaction section 1 due to the hydrogen generation reaction occurred repeatedly. Thus, the method of hydrogen generation by the hydrogen generator of the present invention was confirmed. It was also found that the voltage of the fuel cell at this time was constant, and a necessary amount of hydrogen was supplied from the hydrogen supply instrument.

The amount of supply of the aqueous malic acid solution was set in the following manner: An end portion of the connecting pipe 3 on the side of the reaction section 1 was a nozzle having an inner diameter of the order of 100 μm. The aqueous malic acid solution was supplied such that after forming droplets at the leading end of the nozzle, the aqueous malic acid solution was added dropwise to sodium borohydride, whereby the amount of supply of the aqueous malic acid solution per feeding was set at 0.02 g. A rise in the pressure within the hydrogen supply instrument due to a hydrogen pressure calculated stoichiometrically from the above amount of supply was 30 kPa. The fuel cell had the cathode opened to the atmosphere for oxygen diffusion and supply due to natural convection. The ambient temperature was 25° C., and the temperature regulation of the cell was not performed. Power generation was carried out, with the output power being fixed at 1 W.

As a result of the operation by this system, sodium borohydride converted into hydrogen by the time when the operation was completed was 87% based on the entire sodium borohydride, and the hydrogen storage density at this time was 4.8% by weight.

As shown in FIG. 3, it is seen that within the system, the operation was performed at a pressure within a constant range, because owing to power generation, the internal pressure of the system lowered, but the supply of the aqueous malic acid solution resulted in a rise in the pressure. The range of the changes in the pressure was from −5 kPaG to +10 kPaG, and the fluctuations in the output voltage due to these changes were as small as several mV. Here, the reference pressure was 0 kPaG, but the pressure lowered to a value of the order of −5 kPa. This is because it takes time for droplets to be formed at the leading end of the nozzle before the aqueous malic acid solution is added dropwise onto sodium borohydride, and during this period, the pressure decreases. The pressure increase calculated from the amount of a single supply of the aqueous malic acid solution is 30 kPa, but the upper limit of the pressure was nearly 10 kPa for the same reasons as mentioned above.

The method of setting the reaction conditions in FIG. 3, and the reason for setting these conditions will be described based on FIGS. 4 to 6.

Figure 4:
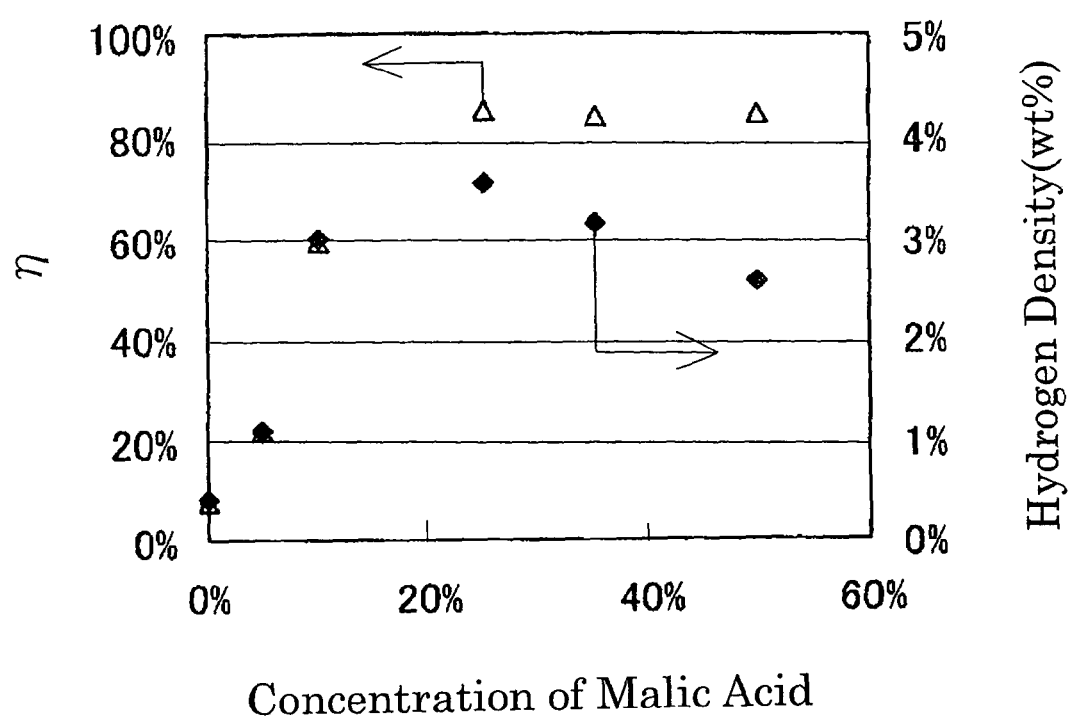
[FIG. 4] A graph showing the malic acid concentration dependence of the reaction efficiency when sodium borohydride was dissolved in an aqueous solution of malic acid.

FIG. 4 gives a graph showing the malic acid concentration dependence of the reaction efficiency when sodium borohydride was dissolved in an aqueous solution of malic acid.

As shown in FIG. 4, the ratio of water in the aqueous malic acid solution with respect to sodium borohydride was 3. This measurement was made not by the method of the present invention in which an aqueous malic acid solution is supplied, little by little, to sodium borohydride, but by a method in which the amount of hydrogen generated when dissolving all the reactants in a pressure vessel is calculated from the internal pressure of the pressure vessel. The reaction efficiency exceeded 10% even when malic acid was incorporated at a concentration of 0.1% by weight resulting in pH 3. At a malic acid concentration of 25% by weight or higher, the reaction efficiency reached saturation of about 85%. Even at a malic acid concentration of 0.1% by weight, an effective hydrogen storage density was obtained. However, when the malic acid concentration was 25% by weight, the hydrogen storage density was found to peak. Thus, a malic acid concentration of 25% by weight was selected as a condition.

Figure 5:
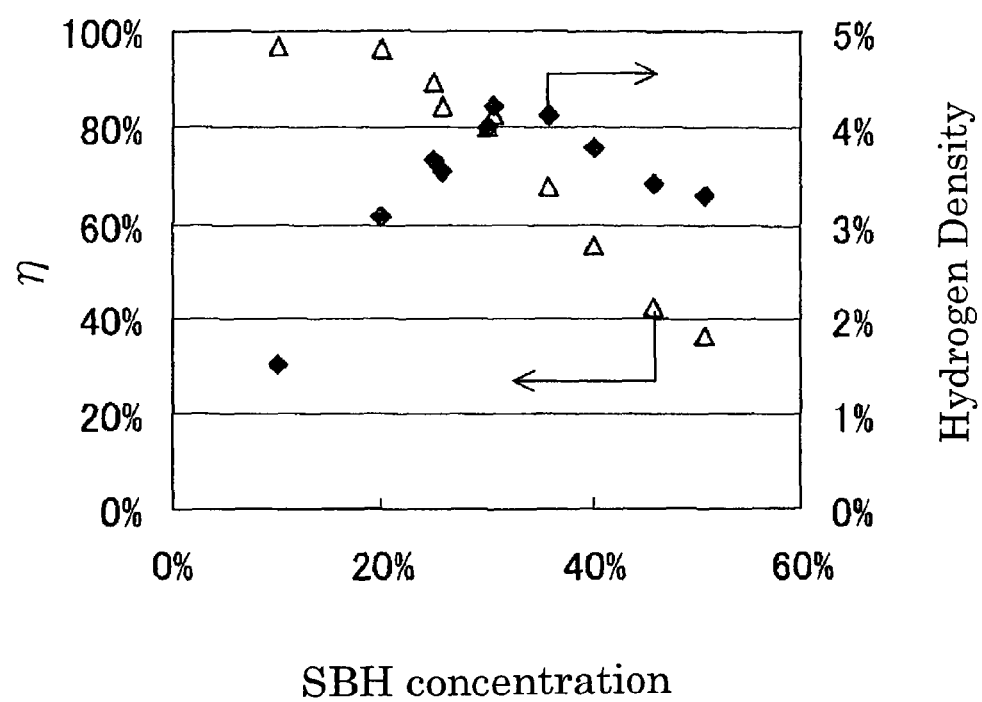
[FIG. 5] A graph showing the sodium borohydride concentration dependence of the reaction efficiency.

FIG. 5 shows a graph showing the sodium borohydride concentration dependence of the reaction efficiency. The malic acid concentration in this measurement was 25% by weight. This measurement was made by the same method as that which set the malic acid concentration in FIG. 3.

As shown in FIG. 5, the reaction efficiency was as high as 95% when the concentration of sodium borohydride was low. However, as the sodium borohydride concentration increased, the efficiency decreased. When the sodium borohydride concentration was 30% by weight, namely, when the ratio of water in the aqueous malic acid solution to sodium borohydride was 1.3, the hydrogen storage density with respect to the total weight of the reactants, calculated from the amount of hydrogen release, was maximal at 4.4% by weight. The reaction efficiency at this time was 81%. Thus, the ratio of water in the aqueous malic acid solution to sodium borohydride being 1.3, and the malic acid concentration of 25% by weight were found to be conditions presenting a maximum hydrogen storage density with the present system. Thus, these conditions were selected.

Figure 6:
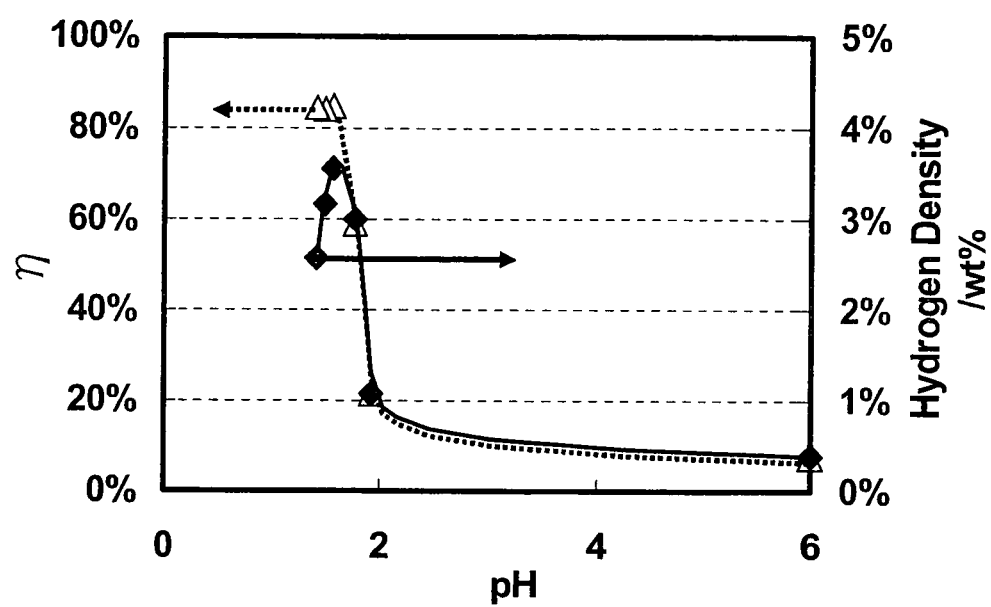
[FIG. 6] A graph showing the dependence of the reaction efficiency on the pH of the malic acid concentration.

FIG. 6 is a graph showing the dependence of the reaction efficiency on the pH of the malic acid concentration.

As shown in FIG. 6, the reaction efficiency was higher than 80%, when the pH was lower than 2. However, at too low a pH, the reaction occurred too rapidly. Thus, and for the purpose of maintaining a hydrogen density, pH of 1 or above was found to be optimal. Preferably, a pH of 1.4 or higher was found to be optimal.

When the pH exceeded 3, the reaction efficiency became 30% or lower, and the hydrogen density also decreased. When the pH became lower than 1.4, or exceeded 2, the reaction efficiency and the hydrogen density tended to decrease. In view of these findings, the pH of the malic acid concentration can be said to be optimally 1 or higher, but 3 or lower. Preferably, and more optimally, the pH of the malic acid concentration is 1.4 or higher, but 2 or lower.

As explained above, in the system utilizing the hydrogen generation reaction of sodium borohydride, it was found that it was possible to supply hydrogen conformed to the electric current of the fuel cell without use of electric power and control the hydrogen generation reaction, and that the hydrogen storage density was increased.

FIG. 7 is a table showing, in addition to the above results of the experiments, the use of other aqueous accelerator solutions, and combinations when a solid accelerator was accommodated in the reaction section 1, as well as the reaction efficiencies.

(1): The fuel cell was operated under conditions in which an aqueous solution of 25% by weight of malic acid was used as an aqueous accelerator solution containing 7.8 g of the accelerator with respect to 10 g of sodium borohydride. The reaction efficiency was 87%. When the aqueous malic acid solution was used, hydrogen was obtained with a high degree of conversion, and the pH of the aqueous solution containing the product was as low as 9.5.

(2): The fuel cell was operated under conditions where an aqueous solution of 10% by weight of nickel chloride was used as an aqueous accelerator solution containing 2.6 g of the accelerator with respect to 10 g of sodium borohydride. The reaction efficiency was 91%. When the aqueous nickel chloride solution was used, the amount of the catalyst was reduced, and the degree of conversion could be rendered high.

(3): The fuel cell was operated under conditions where an aqueous solution of 15% by weight of malic acid and 5% by weight of nickel chloride was used as an aqueous accelerator solution containing 5.3 g of the accelerator with respect to 10 g of sodium borohydride. The reaction efficiency was 94%. When the aqueous solution of malic acid and nickel chloride was used, the degree of conversion was rendered high, the amount of the catalyst could be reduced, and the pH of the aqueous solution containing the product was of the order of 10.0.

(4): An aqueous solution of 10% by weight of nickel chloride was used as an aqueous accelerator solution, and 0.3 of solid nickel chloride was accommodated as a solid accelerator into the reaction section 1. The fuel cell was operated, with the amount of the accelerator in the aqueous accelerator solution being 2.6 g with respect to 10 g of sodium borohydride. When sodium borohydride was dissolved in the aqueous accelerator solution to cause a hydrogen generation reaction, a rapid reaction rate was exhibited initially, but the reaction slowed over time. The reaction site at a slow reaction rate was an aqueous solution. When this aqueous solution contacted the solid nickel chloride, the phenomenon was observed that the solid nickel chloride dissolved to increase the rate of the hydrogen generation reaction. As a result, in comparison with the case where no solid nickel chloride was accommodated in the reaction section, a long time was taken until the internal pressure of the reaction section 1 became lower than the reference pressure, and a large amount of water contained in the aqueous accelerator solution was reacted. The reaction efficiency was 96%.

(5): In place of the solid nickel chloride in (4), 0.3 g of solid cobalt chloride was accommodated in the reaction section. The reaction efficiency was 96%.

(6): In place of the solid nickel chloride in (4), 0.5 g of solid malic acid was accommodated in the reaction section. The reaction efficiency was 94%.

In (4) to (6), the catalyst was fixed in the reactor. Thus, the amount of the catalyst increased, but the degree of conversion could be enhanced.

(7): Instead of the aqueous solution of 10% by weight of nickel chloride in (6), an aqueous malic acid solution with a concentration of 20% by weight was used as the aqueous accelerator solution. The fuel cell was operated, with the amount of the accelerator in the aqueous accelerator solution being 5.8 g with respect to 10 of sodium borohydride. The reaction efficiency was 91%.

(8): In place of the solid malic acid in (7), 0.3 g of solid cobalt chloride was accommodated in the reaction section. The reaction efficiency was 92%.

(9): In place of the solid cobalt chloride in (8), 0.3 g of palladium was accommodated as a precious metal into the reaction section. The reaction efficiency was 89%.

In (7) to (9), the amount of the catalyst can be decreased, and the degree of conversion can be raised. Moreover, the speed of fluctuations in the internal pressure can be rendered low (see FIG. 9 to be described later), resulting in high safety and controllability.

(10): In addition to (3), 0.3 g of solid nickel chloride was accommodated as a solid accelerator into the reaction section 1. The reaction efficiency was 97%.

In (10), the amount of the catalyst increased, because the catalyst was fixed within the reactor. However, the degree of conversion can be raised.

Hence, the use of the combinations in (1) to (10) is found to exhibit very high reaction efficiencies and obtain high hydrogen storage densities.

Sodium, potassium and lithium can be used for salts of the metal chlorides, and iron can be used as the metal. Moreover, an aluminum hydride salt can be used as the complex hydride. When a metal considered to be lower in oxidation-reduction potential than hydrogen is used for the complex hydride, an acid is used as the accelerator of the aqueous accelerator solution. Hydrochloric acid and sulfuric acid can be used as the acid. For the complex hydride, an amphoteric metal can be used. In this case, a basic aqueous solution is used as the aqueous accelerator solution. Aluminum, zinc, tin, and lead are used as the amphoteric metals, and sodium hydroxide is used for the basic aqueous solution.

As described above, the aqueous solution of nickel chloride as a metal chloride is applied as the accelerator of the aqueous accelerator solution in (2), (4) to (6). Here, the concentration of nickel chloride is 0.1% by weight or more, but 40% by weight or less, preferably 0.1% by weight or more to up to 25% by weight. Using FIG. 8, the dependence of the degree of conversion on the concentration of nickel chloride will be explained.

Figure 8:
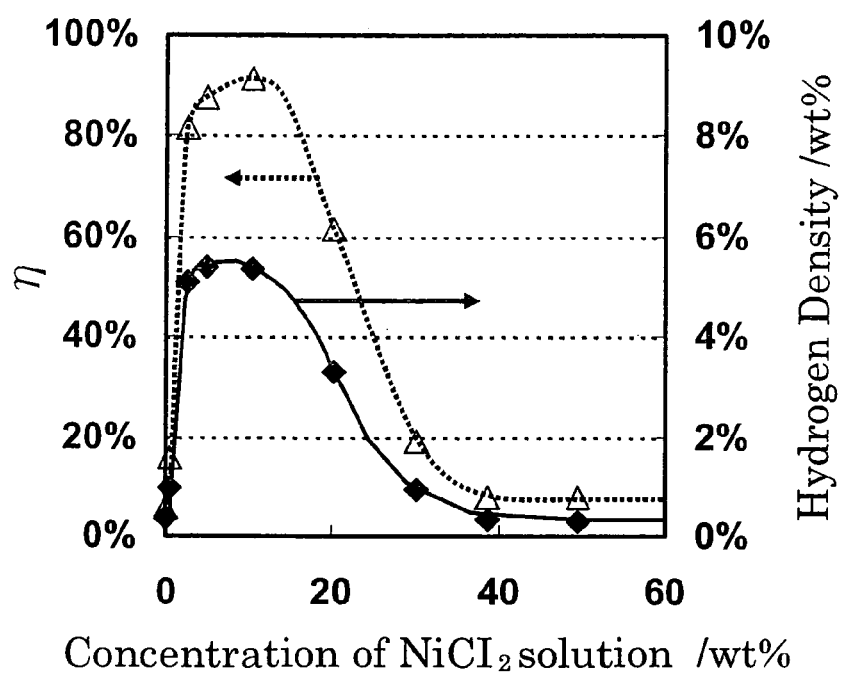
[FIG. 8] A graph showing the dependence of the reaction efficiency on the concentration of nickel chloride.

FIG. 8 is a graph showing the dependence of the reaction efficiency on the concentration of nickel chloride. In evaluating the reaction efficiency and the hydrogen density, the lower limit of the concentration of nickel chloride was based on the degree of conversion in the initial stage of the reaction after a lapse of 5 minutes from the initiation of the reaction, while the upper limit of the concentration of nickel chloride was based on the height of the reaction efficiency on completion of the reaction. In the drawing, the values of the reaction efficiency and the hydrogen density at the left end on the ordinate axis are not values in the absence of nickel chloride, but values in % by weight upon addition of nickel chloride, for example, values of 0.1% by weight or less.

As shown in FIG. 8, a reaction efficiency of 10% or more was reached in a concentration region of 0.1% by weight or higher 5 minutes after initiation of the reaction, showing that the reaction proceeded with a high degree of conversion. In the concentration range of up to 20% by weight, a high reaction efficiency and a high hydrogen density were obtained. In the concentration range of up to 25% by weight, these parameters remained high. At the concentration exceeding 40% by weight, the reaction efficiency and the hydrogen density were kept in a nearly unchanged state. Thus, a nickel chloride concentration, i.e., a metal chloride concentration, of 0.1% by weight or higher, but 40% by weight or lower, and further 0.1% by weight or higher, but 25% by weight or lower, was selected as a condition providing optimal values. More preferably, a metal chloride concentration of 1.0% by weight or higher, but 15% by weight or lower, is selected, because it is seen, as shown in FIG. 8, that between 1.0% by weight and 15% by weight, the reaction efficiency and the hydrogen density peak.

Figure 9:
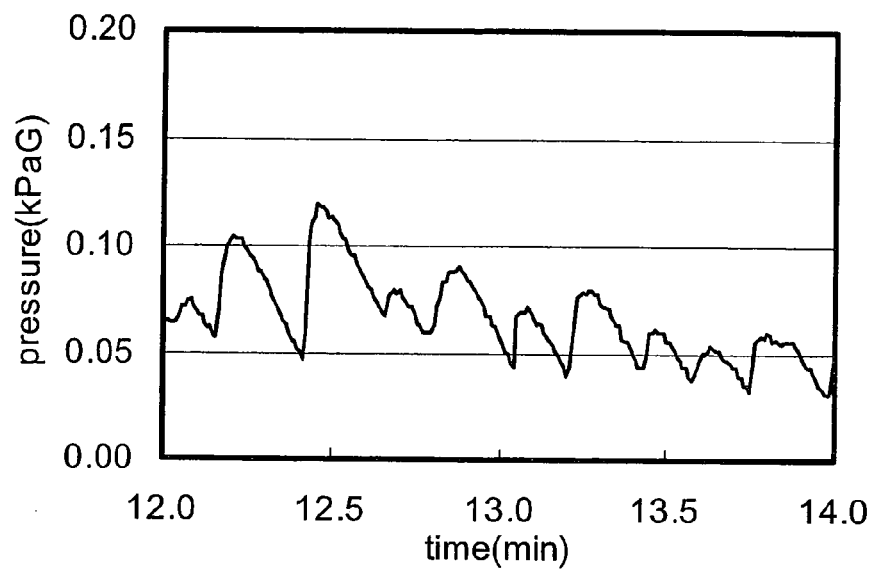
[FIG. 9] A graph showing changes overtime in the pressure of hydrogen generated when a solid catalyst is not accommodated.
Figure 10:
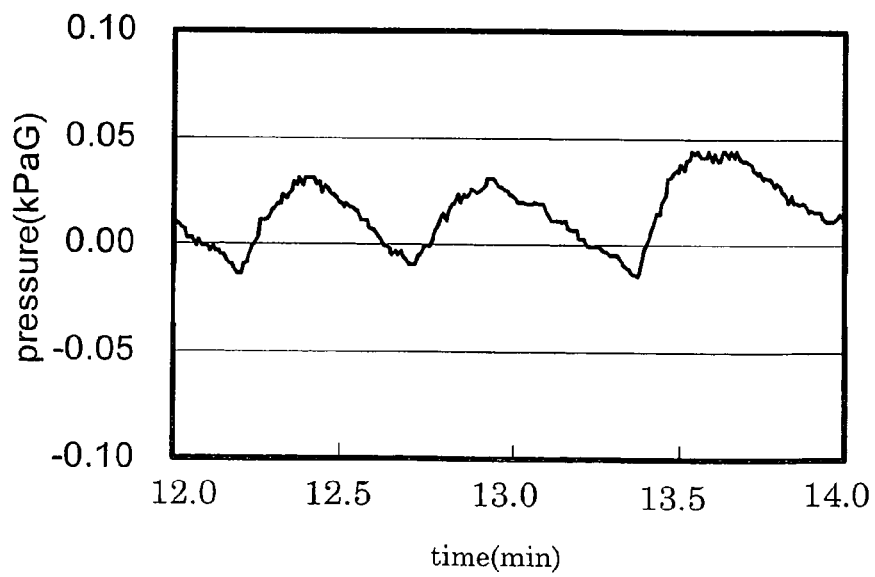
[FIG. 10] A graph showing changes over time in the pressure of hydrogen generated when the solid catalyst is accommodated.

Based on FIGS. 9 and 10, an explanation will be offered for the reaction status prevailing when a fixed catalyst (a precious metal or a hydrogen absorbing alloy) was accommodated in a reactor. FIG. 9 shows changes over time in the pressure of hydrogen generated (rte of hydrogen generation) when the solid catalyst was not accommodated. FIG. 10 shows changes over time in the pressure of hydrogen generated (rate of hydrogen generation) when the solid catalyst was accommodated. As the concrete conditions, a current of 6 A was generated in (1) shown in FIG. 7 in the case of FIG. 9, and a current of 6 A was generated in (7) shown in FIG. 7 in the case of FIG. 10.

FIG. 9 and FIG. 10 are different in the reaction rate when the aqueous catalyst solution was added dropwise to sodium borohydride in the fuel cell system. Here, the slope of the graph is related to the rate of hydrogen generation and the generated current. Since the generated current is equal in FIGS. 9 and 10, the difference in the profile is ascribed to the difference in the rate of hydrogen generation. The rate of hydrogen generation is related to the amount of the catalyst and the amount of water supplied, and becomes higher as the amount of supply increases. Thus, when the aqueous accelerator solution is supplied, the graph rises. One cycle of the profile is related to the amount of water supplied, changes in the rate of hydrogen generation, and electric current. The larger the amount of water supply, the longer the one cycle. Moreover, the shorter the time from the supply of the aqueous accelerator solution until the rate of hydrogen generation changes and becomes lower than the rate of hydrogen consumption due to current generation, the shorter the one cycle becomes.

Both drawings will be compared below. The symbols (a) to (c) represent the contents of the corresponding cases.

FIG. 9

(a) The sodium borohydride and the aqueous solution meet each other to proceed with the reaction. Thus, the reaction rate changes smoothly. Consequently, the line of the graph shows few small irregularities.

(b) The rise and the fall are steep. This shows that the rate of hydrogen generation changes to a high degree.

(c) One cycle is short, and the amount of water supply is small.

FIG. 10

(a) In addition to the meeting between the sodium borohydride and the aqueous solution, the materials during the reaction and the accelerator fixed to the reactor contact each other to proceed with the reaction. The materials during the reaction are foamy, and contain sodium borohydride and water on the surfaces of the foams. Since the materials during the reaction are in foamy shape, the timing of contact between the accelerator fixed to the reactor and the materials during the reaction varies widely. Thus, there are many small irregularities on the line of the graph.

(b) The rise and the fall are gentle. This shows that the rate of hydrogen generation changes slowly. Thus, high safety and controllability are obtained. The reasons why the rise speed slows are that (i) since the accelerator is located within the reactor, the amount of contact between water and sodium borohydride is reduced at a time when the aqueous accelerator solution is supplied to sodium borohydride and (ii) the concentration of the aqueous accelerator solution is low.

(c) One cycle is long, but the amount of the pressure change is comparable to that in FIG. 9. The amount of water supply is large. The reason is a slow rise speed.

FIG. 9 and FIG. 10 are different in pressure, because the valve opening pressure of the valve is different. The absolute values of the pressure are unrelated to the rate of hydrogen generation and the generated current.

That is, even when the aqueous accelerator solution and the sodium borohydride are mixed, it is not that all the reactants react immediately. Thus, the outcome is the formation of a mixed aqueous solution having the reactants mixed with the product already formed. This aqueous solution contains sodium borohydride, thus causing a hydrogen generation reaction. The reaction rate is slowed compared with that immediately after supply of the aqueous accelerator solution. Thus, the reaction rate can be increased by contact with a solid accelerator held in solid form.

When the solid accelerator is accommodated, therefore, the speed of fluctuations in the internal pressure can be lowered, ensuring high safety and controllability. Even if the amount of water supplied is increased, the amount of the pressure change is comparable. Thus, even when no solid accelerator is accommodated, the amount of the pressure change may be decreased by reducing the amount of water supply. Consequently, high safety and controllability are obtained.

The concrete configurations of a hydrogen generator and a fuel cell apparatus according to the present invention will be described based on FIGS. 11 to 22. In the drawings, the workpiece is described as a complex hydride, for example, sodium borohydride. The reaction solution is described as an aqueous accelerator solution, for example, an aqueous solution of malic acid. It is possible to apply a complex hydride, other than sodium borohydride, as the workpiece. It is also possible to apply, for example, the aqueous accelerator solution illustrated in FIG. 7 as the reaction solution.

Figure 11:
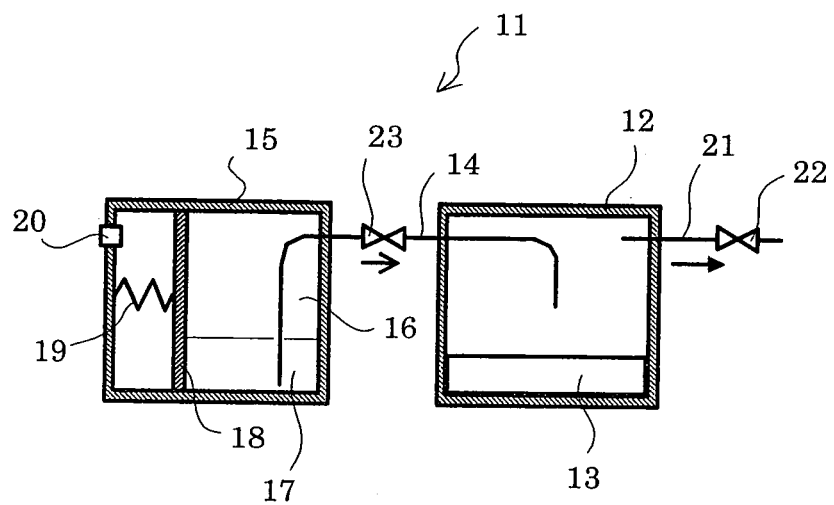
[FIG. 11] A schematic configuration drawing of a hydrogen generator according to a first embodiment of the present invention.
Figure 12:
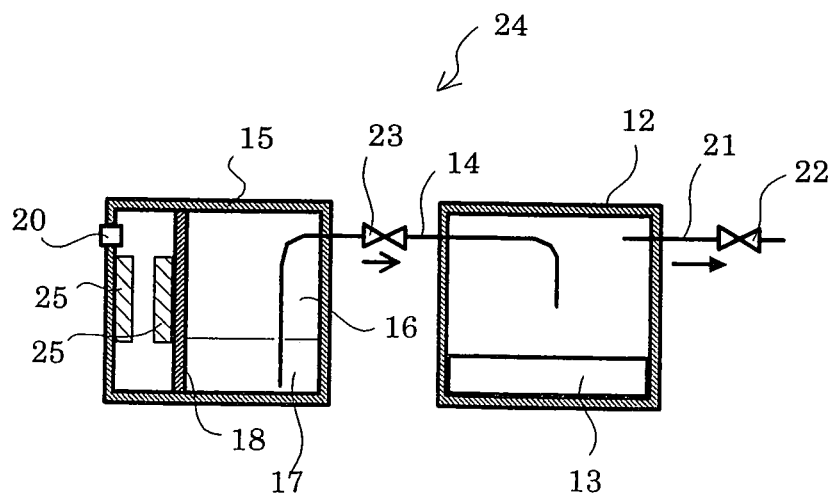
[FIG. 12] A schematic configuration drawing of a hydrogen generator according to a second embodiment of the present invention.
Figure 13:
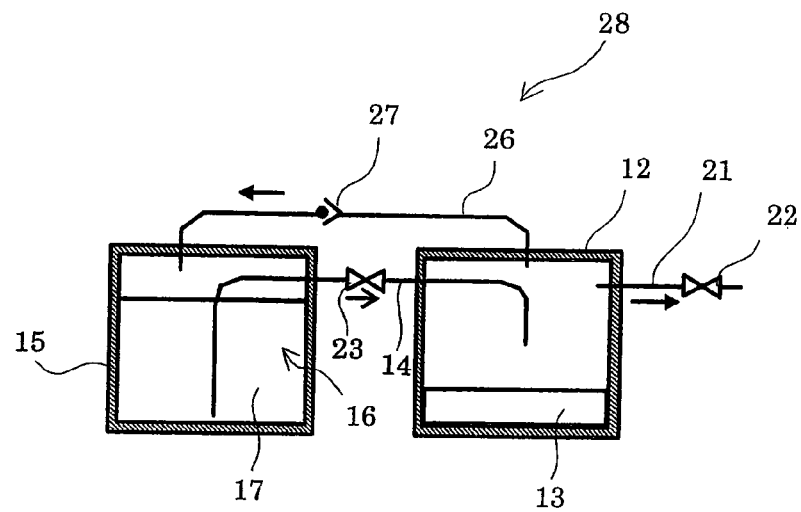
[FIG. 13] A schematic configuration drawing of a hydrogen generator according to a third embodiment of the present invention.

FIG. 11 shows the schematic configuration of a hydrogen generator according to a first embodiment of the present invention. FIG. 12 shows the schematic configuration of a hydrogen generator according to a second embodiment of the present invention. FIG. 13 shows the schematic configuration of a hydrogen generator according to a third embodiment of the present invention.

The hydrogen generator according to the first embodiment will be described based on FIG. 11.

A hydrogen generator 11 is equipped with a reaction chamber 12 (corresponding to the reaction section 1 in FIG. 1) as a hydrogen supply instrument, and a workpiece 13 (e.g., sodium borohydride) as a hydrogen generation reactant is stored in the reaction chamber 12. A solution tank 15 as an aqueous solution reservoir is connected to the reaction chamber 12 via a liquid feed pipe 14 as a supply pipe. The liquid feed pipe 14 is connected to a liquid chamber 16 which is a fluid chamber of the solution tank 15. A reaction solution 17 (e.g., an aqueous solution of malic acid), which is an aqueous accelerator solution, is stored in the liquid chamber 16, and the liquid chamber 16 is partitioned by a moving wall 18.

The moving wall 18 is urged toward the liquid chamber 16 by a compression spring 19, and the liquid chamber 16 is pressed by the moving wall 18, and is thus pressurized. That is, the moving wall 18 is always pressed by the compression spring 19. Thus, under conditions where the reaction solution 17 flows through the liquid feed pipe 14, the moving wall 18 can push out the reaction solution 17. When the reaction solution 17 is sent to the reaction chamber 12 through the liquid feed pipe 14, the reaction solution 17 and the workpiece 13 contact to cause a hydrogen generation reaction. In the drawing, the numeral 20 denotes an air inlet intended not to impede the movement of the moving wall 18.

A hydrogen conduit 21 as a discharge means is connected to the reaction chamber 12, and a regulator 22 is provided in the hydrogen conduit 21. The amount of hydrogen discharge from the reaction chamber 12 is regulated by the regulator 22. Although it is designed that the amount of hydrogen discharge can be controlled by the regulator 22, it is possible to discharge hydrogen at a constant hydrogen pressure with the use of a constant pressure valve.

A pressure regulating valve 23 for pressure regulation is installed in the liquid feed pipe 14, and the pressure regulating valve 23 is a valve for regulating the pressure when the reaction solution 17 is allowed to flow. The output pressure when the reaction solution 17 is allowed to flow is the pressure during opening of the pressure regulating valve 23 (valve opening pressure). When the pressure inside the reaction chamber 12 exceeds the valve opening pressure, the pressure regulating valve 23 closes. When the pressure inside the reaction chamber 12 becomes lower than the valve opening pressure (falls to a predetermined value or lower), the pressure regulating valve 23 opens.

That is, the internal pressure of the liquid chamber 16 is kept at a value higher than the pressure for opening of the pressure regulating valve 23 (is kept at a pressure adapted to open the pressure regulating valve 23 and exceeding the predetermined pressure value of the reaction chamber 12) as a result of pressurization. The pressure regulating valve 23 is designed such that in a constant pressure state where the internal pressure of the reaction chamber 12 falls to the predetermined value or lower, the valve body opens to permit the passage of the reaction solution 17 from the liquid chamber 16 to the reaction chamber 12.

The pressure regulating valve 23 is, for example, a constant pressure valve, and is composed of a primary channel which is a channel on the side of the liquid chamber 16 of the solution tank 15, a secondary channel which is a channel on the side of the reaction chamber 12, the valve body provided between the primary channel and the secondary channel, an external pressure transmission path for transmitting the pressure of the outside to the valve, and an internal pressure transmission path for transmitting the internal pressure of the reaction chamber 12 to the valve body.

The solution tank 15 and the reaction chamber 12 may be constituted by a single container member by separating the liquid chamber 16 of the solution tank 15 from the reaction chamber 12 by a wall member as the partition. Further, a communication hole may be formed in the wall member separating the liquid chamber 16 and the reaction chamber 12, and the pressure regulating valve 23 may be provided in the communication hole. This configuration obviates the need for the liquid feed pipe 14, and can cut down the number of the components.

The actions of the above-described hydrogen generator 11 will be described.

The reaction solution 17 is fed from the liquid chamber 16 of the solution tank 15 to the reaction chamber 12 through the liquid feed pipe 14. In addition to the pressurization of the liquid chamber 16, the internal pressure of the reaction chamber 12 in the absence of hydrogen generation is rendered so low as to open the pressure regulating valve 23. Thus, the reaction solution 17 is fed through the liquid feed pipe 14.

Upon feeding of the reaction solution 17 to the reaction chamber 12, the reaction solution 17 and the workpiece 13 contact and react to generate hydrogen. Once hydrogen is generated, the internal pressure of the reaction chamber 12 rises, and exceeds the valve opening pressure of the pressure regulating valve 23 (brings the pressure regulating valve 23 to closure). Upon elevation of the internal pressure of the reaction chamber 12, the pressure regulating valve 23 enters into a closed state to stop the supply of the reaction solution 17 through the liquid feed pipe 14.

When the reaction solution 17 is not supplied any more, the reaction rate of the hydrogen generation reaction in the reaction chamber 12 lowers, and generated hydrogen is discharged through the hydrogen conduit 21 of the reaction chamber 12. Since the internal pressure of the reaction chamber 12 lowers, it becomes such a low pressure that the pressure regulating valve 23 is opened. As a result, the reaction solution 17 is fed again from the liquid chamber 16 of the solution tank 15 to the reaction chamber 12, whereby the reaction solution 17 and the workpiece 13 contact to generate hydrogen.

Here, a pressing means is used to feed the reaction solution 17 from the liquid chamber 16 of the solution tank 15. That is, the moving wall 18 is urged toward the liquid chamber 16 by the compression spring 19, and the reaction solution 17 is fed under the pressurizing force with which the liquid chamber 16 is pressed by the moving wall 18. The reaction solution 17 is always subject to the force, with which it is discharged from the solution tank 15, by pressurization by means of the compression spring 19 via the moving wall 18. However, the pressure changes according to the amount of displacement of the compression spring 19.

In connection with the change in the discharge speed of the reaction solution 17, there is the pressure regulating valve 23 which is open owing to a decrease in the internal pressure of the reaction solution 17, and whose valve opening pressure is constant. Thus, the discharge speed of the reaction solution 17 is constant, regardless of the pressure of the liquid chamber 16 of the solution tank 15. Furthermore, the pressure regulating valve 23 is opened and closed depending on the relationship between the internal pressure and the external pressure of the reaction chamber 12. Since the external pressure (concretely, atmospheric pressure) is constant, the internal pressure of the reaction chamber 12 is kept nearly constant.

Hence, the reaction solution 17 can be stably supplied to the reaction chamber 12 in accordance with the pressure state without use of power, whereby hydrogen can be generated. By varying the capacity of the liquid chamber 16 by the moving wall 18, the liquid chamber 16 is pressurized, whereby the pressure state permitting the pressure regulating valve 23 to open can be retained. Moreover, the moving wall 18 is pressed by the urging force of the compression spring 19. Thus, a very simple configuration enables the moving wall 18 to be pressed.

The hydrogen generator according to the second embodiment will be described based on FIG. 12. The same members as those shown in FIG. 11 are assigned the same numerals as in FIG. 11, and duplicate explanations are omitted.

A hydrogen generator 24 according to the second embodiment is arranged to have a pair of magnets 25 instead of the compression spring 19 of the hydrogen generator 11 shown in FIG. 11. That is, a moving wall 18 is urged toward a liquid chamber 16 by the repulsive force of the magnets 25, so that the liquid chamber 16 is pressed by the moving wall 18, and is thus pressurized. The moving wall 18 is always pressed by the repulsive force of the magnets 25. Thus, under conditions where a reaction solution 17 flows through a liquid feed pipe 14, the moving wall 18 can push out the reaction solution 17.

With the hydrogen generator 24, therefore, the moving wall 18 can be pressed by a very simple configuration under the magnetic force of the magnets 25.

The hydrogen generator according to the third embodiment will be described based of FIG. 13. The same members as those shown in FIGS. 11 and 12 are assigned the same numerals as in FIGS. 11 and 12.

A hydrogen generator 28 is equipped with a reaction chamber 12, and a workpiece 13 is stored in the reaction chamber 12. A solution tank 15 is connected to the reaction chamber 12 via a liquid feed pipe 14, and the liquid feed pipe 14 is connected to a liquid chamber 16 of the solution tank 15. A reaction solution 17 is stored in the liquid chamber 16. A hydrogen conduit 21 is connected to the reaction chamber 12, and a regulator 22 is provided in the hydrogen conduit 21. The amount of hydrogen discharge from the reaction chamber 12 is regulated by the regulator 22.

A pressure regulating valve 23 for pressure regulation is installed in the liquid feed pipe 14, and the pressure regulating valve 23 is a valve for regulating the pressure when the reaction solution 17 is allowed to flow. The output pressure when the reaction solution 17 is allowed to flow is the pressure, during opening of the pressure regulating valve 23 (valve opening pressure). When the pressure inside the reaction chamber 12 exceeds the valve opening pressure, the pressure regulating valve 23 closes. When the pressure inside the reaction chamber 12 becomes lower than the valve opening pressure (falls to a predetermined value or lower), the pressure regulating valve 23 opens.

Aside from the liquid feed pipe 14, a pressure transmission pipe 26 connects the reaction chamber 12 to the liquid chamber 16 of the solution tank 15. Hydrogen generated in the reaction chamber 12 is sent to the liquid chamber 16 of the solution tank 15 through the pressure transmission pipe 26. A check valve 27 is provided in the pressure transmission pipe 26, and the check valve 27 permits the passage of hydrogen from the reaction chamber 12 only to the liquid chamber 16. That is, hydrogen is prevented from flowing from the liquid chamber 16 to the reaction chamber 12.

The principle of supplying the reaction solution 17 to the reaction chamber 12 is based on the pressure difference between the solution tank 15 and the reaction chamber 12 which has resulted from an increase in the internal pressure of the solution tank 15 and a decrease in the pressure of the reaction chamber 12. Hydrogen is generated in the reaction chamber 12 to raise the pressure, whereby hydrogen flows from the reaction chamber 12 into the solution tank 15 to raise the internal pressure of the solution tank 15. In the reaction chamber 12, on the other hand, hydrogen is discharged to the outside through the hydrogen conduit 21 via the regulator 22, with the result that the pressure of the reaction chamber 12 decreases. Thus, a pressure difference arises between the solution tank 15 and the reaction chamber 12, whereupon the reaction solution 17 moves toward the reaction chamber 12.

The actions of the above-described hydrogen generator 28 will be described.

The reaction solution 17 is fed from the liquid chamber 16 of the solution tank 15 to the reaction chamber 12 through the liquid feed pipe 14. In addition to the pressurization of the liquid chamber 16, the internal pressure of the reaction chamber 12 in the absence of hydrogen generation is rendered so low as to open the pressure regulating valve 23. Thus, the reaction solution 17 is fed through the liquid feed pipe 14.

Upon feeding of the reaction solution 17 to the reaction chamber 12, the reaction solution 17 and the workpiece 13 contact and react to generate hydrogen. Once hydrogen is generated, the internal pressure of the reaction chamber 12 rises, and exceeds the valve opening pressure of the pressure regulating valve 23 (brings the pressure regulating valve 23 to closure). Upon elevation of the internal pressure of the reaction chamber 12, the pressure regulating valve 23 enters into a closed state to stop the supply of the reaction solution 17 through the liquid feed pipe 14.

When the reaction solution 17 is not supplied anymore, the reaction rate of the hydrogen generation reaction in the reaction chamber 12 lowers, and generated hydrogen is discharged through the hydrogen conduit 21 of the reaction chamber 12. Since the internal pressure of the reaction chamber 12 lowers, it becomes such a low pressure that the pressure regulating valve 23 is opened. As a result, the reaction solution 17 is fed again from the liquid chamber 16 of the solution tank 15 to the reaction chamber 12, whereby the reaction solution 17 and the workpiece 13 contact to generate hydrogen.

Here, a pressing means is used to feed the reaction solution 17 from the liquid chamber 16 of the solution tank 15. That is, when hydrogen is generated within the reaction chamber 12 to raise the pressure, hydrogen is sent to the solution tank 15 through the pressure transmission pipe 26 to transmit the pressure from the reaction chamber 12 to the solution tank 15. Simultaneously, hydrogen in the reaction chamber 12 is discharged through the hydrogen conduit 21, whereupon the internal pressure of the reaction chamber 12 lowers. As a result, the solution tank 15 is pressurized by the action of the check valve 27 into a state where the internal pressure of the solution tank 15 is kept higher than the internal pressure of the reaction chamber 12. Thus, the reaction solution 17 is fed to the reaction chamber 12.

Hence, the reaction solution 17 can be stably supplied to the reaction chamber 12 in accordance with the pressure state without use of power, whereby hydrogen can be generated. Moreover, the solution tank 15 is pressurized by hydrogen flowing in via the check valve 27 of the pressure transmission pipe 26, whereby a pressure state permitting the pressure regulating valve 23 to open can be retained.

The fuel cell apparatus equipped with the hydrogen generator of the present invention will be described based on FIGS. 14 and 15.

Figure 14:
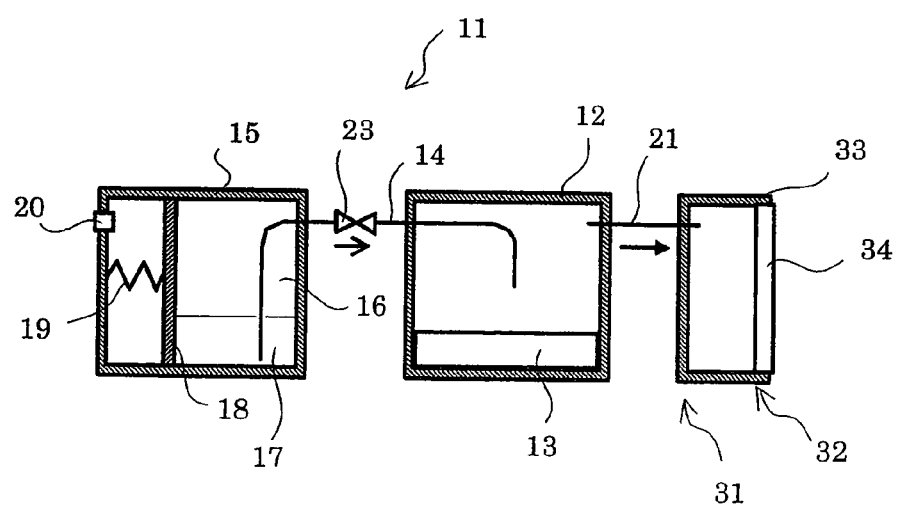
[FIG. 14] A schematic configuration drawing of a fuel cell apparatus according to the first embodiment of the present invention.

FIG. 14 shows the schematic configuration of the fuel cell apparatus according to the first embodiment of the present invention. FIG. 15 shows the schematic configuration of the fuel cell apparatus according to the second embodiment of the present invention.

A fuel cell system 31 shown in FIG. 14 is a system in which the hydrogen generator 11 shown in FIG. 11 is connected to a fuel cell 32. That is, the fuel cell 32 is equipped with an anode chamber 33 as a negative electrode chamber, and the anode chamber 33 constitutes a space contiguous to an anode room of a fuel cell unit cell 34. The anode room is a space for temporarily storing hydrogen to be consumed by the anode. The anode chamber 33 and the reaction chamber 12 are connected by a hydrogen conduit 21, and hydrogen generated in the reaction chamber 12 is supplied to the anode room of the anode chamber 33. Hydrogen supplied to the anode room is consumed by the fuel cell reaction in the anode. The amount of hydrogen consumption in the anode is determined by the output current of the fuel cell 32.

The regulator 22 provided in the hydrogen conduit 21 shown in FIG. 11 is not mounted, because it need not be installed.

The above-mentioned fuel cell system 31 can be configured as the fuel cell system 31 equipped with the hydrogen generator 11 which can stably supply the reaction solution 17 and generate hydrogen without using a complicated mechanism or mechanical power.

Figure 15:
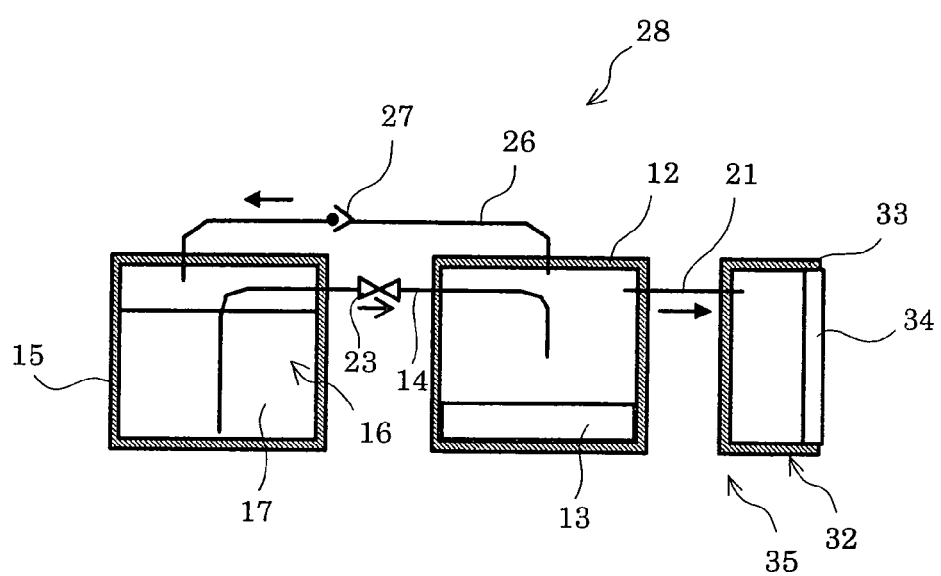
[FIG. 15] A schematic configuration drawing of a fuel cell apparatus according to the second embodiment of the present invention.

A fuel cell apparatus 35 shown in FIG. 15 is a system in which the hydrogen generator 28 shown in FIG. 13 is connected to a fuel cell 32. That is, the fuel cell 32 is equipped with an anode chamber 33, and the anode chamber 33 constitutes a space contiguous to an anode room of a fuel cell unit cell 34. The anode room is a space for temporarily holding hydrogen to be consumed by the anode. The anode chamber 33 and the reaction chamber 12 are connected by a hydrogen conduit 21, and hydrogen generated in the reaction chamber 12 is supplied to the anode room of the anode chamber 33. Hydrogen supplied to the anode room is consumed by the fuel cell reaction of the anode. The amount of hydrogen consumption in the anode is determined by the output current of the fuel cell 32.

The regulator 22 provided in the hydrogen conduit 21 shown in FIG. 13 is not mounted, because it need not be installed.

The above-mentioned fuel cell apparatus 35 can be configured as the fuel cell apparatus 35 equipped with the hydrogen generator 24 which can stably supply the reaction solution 17 and generate hydrogen without using a complicated mechanism or mechanical power.

Figure 16:
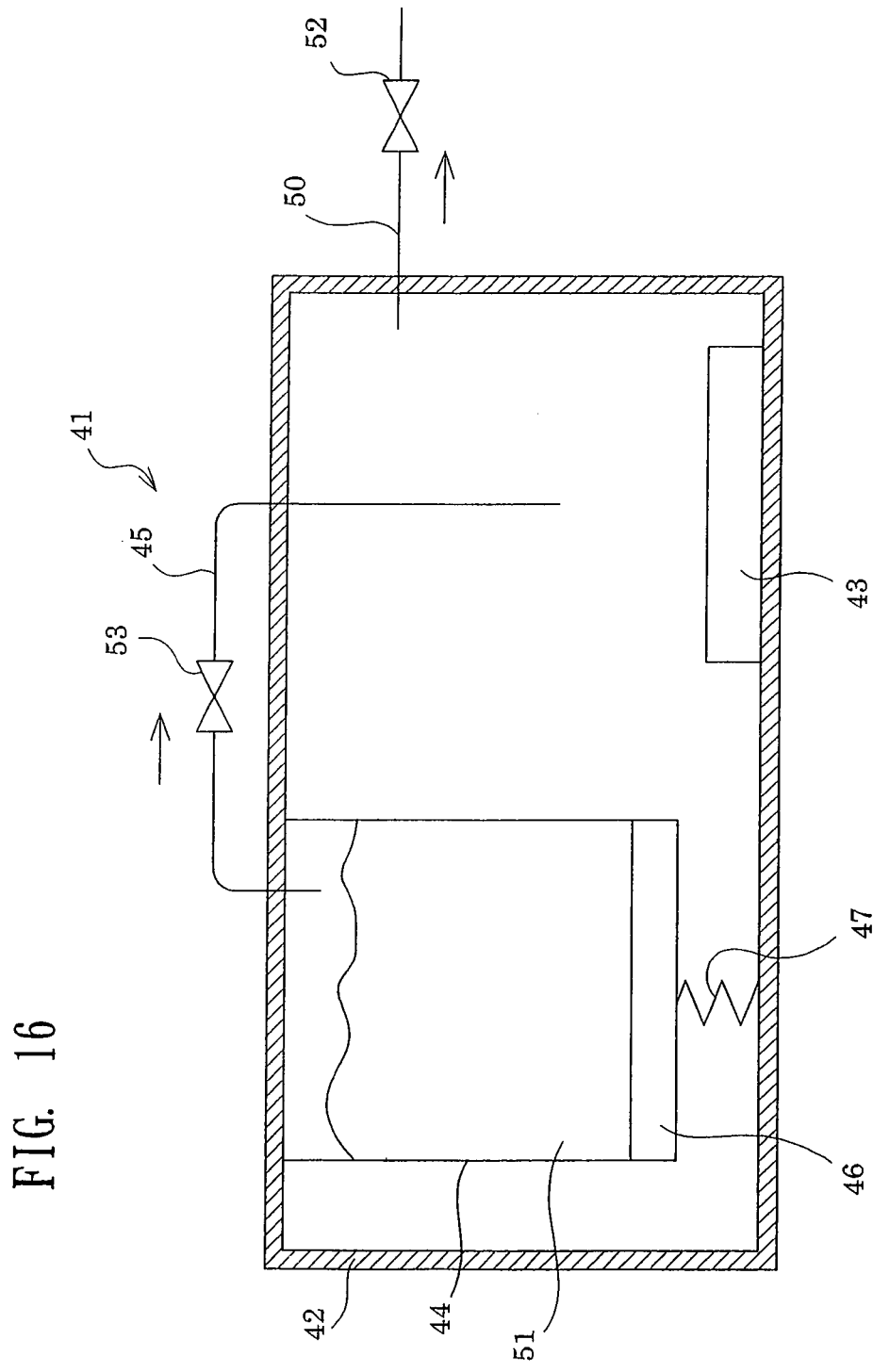
[FIG. 16] A schematic configuration drawing of a hydrogen generator according to a fourth embodiment of the present invention.
Figure 17:
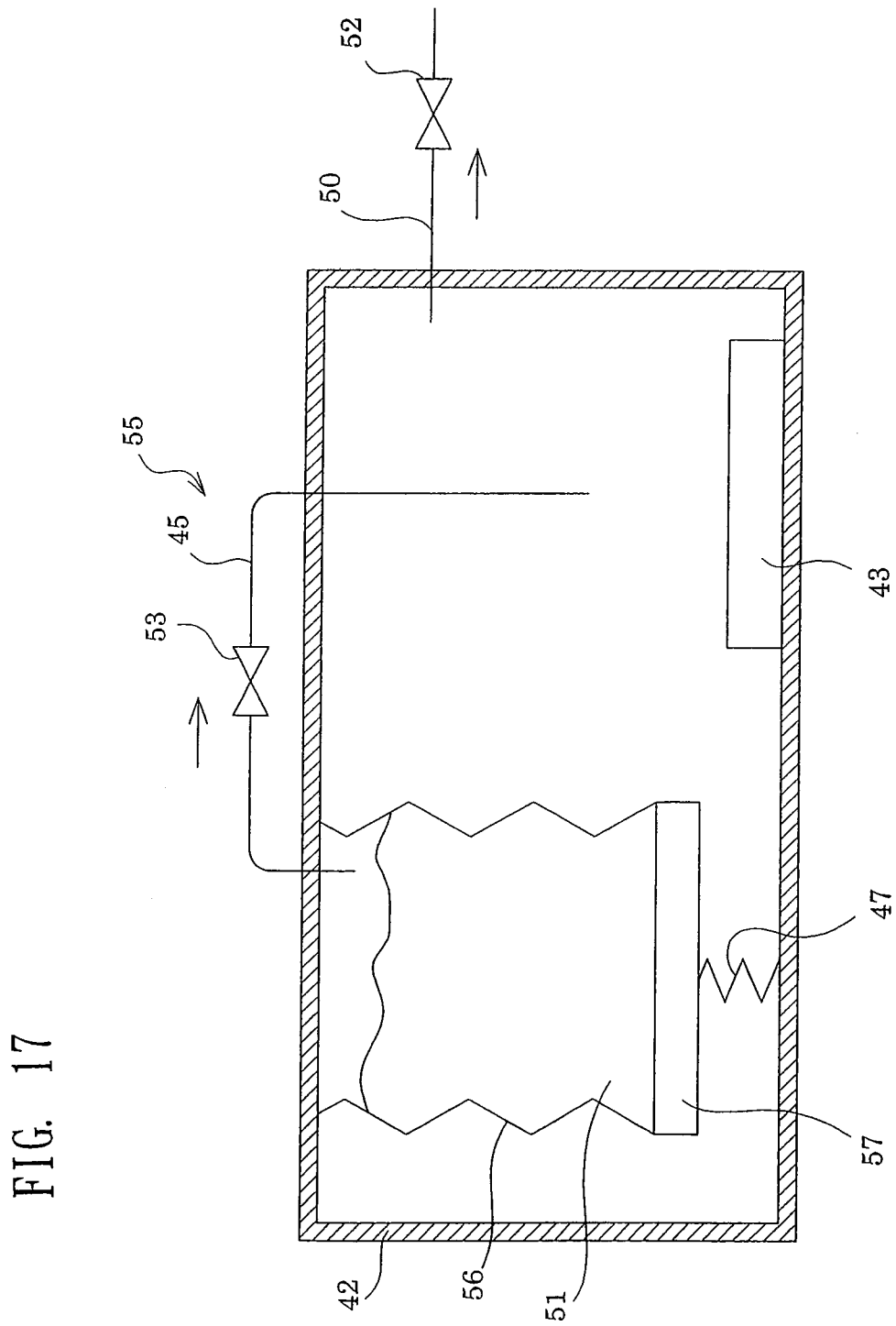
[FIG. 17] A schematic configuration drawing of a hydrogen generator according to a fifth embodiment of the present invention.
Figure 18:
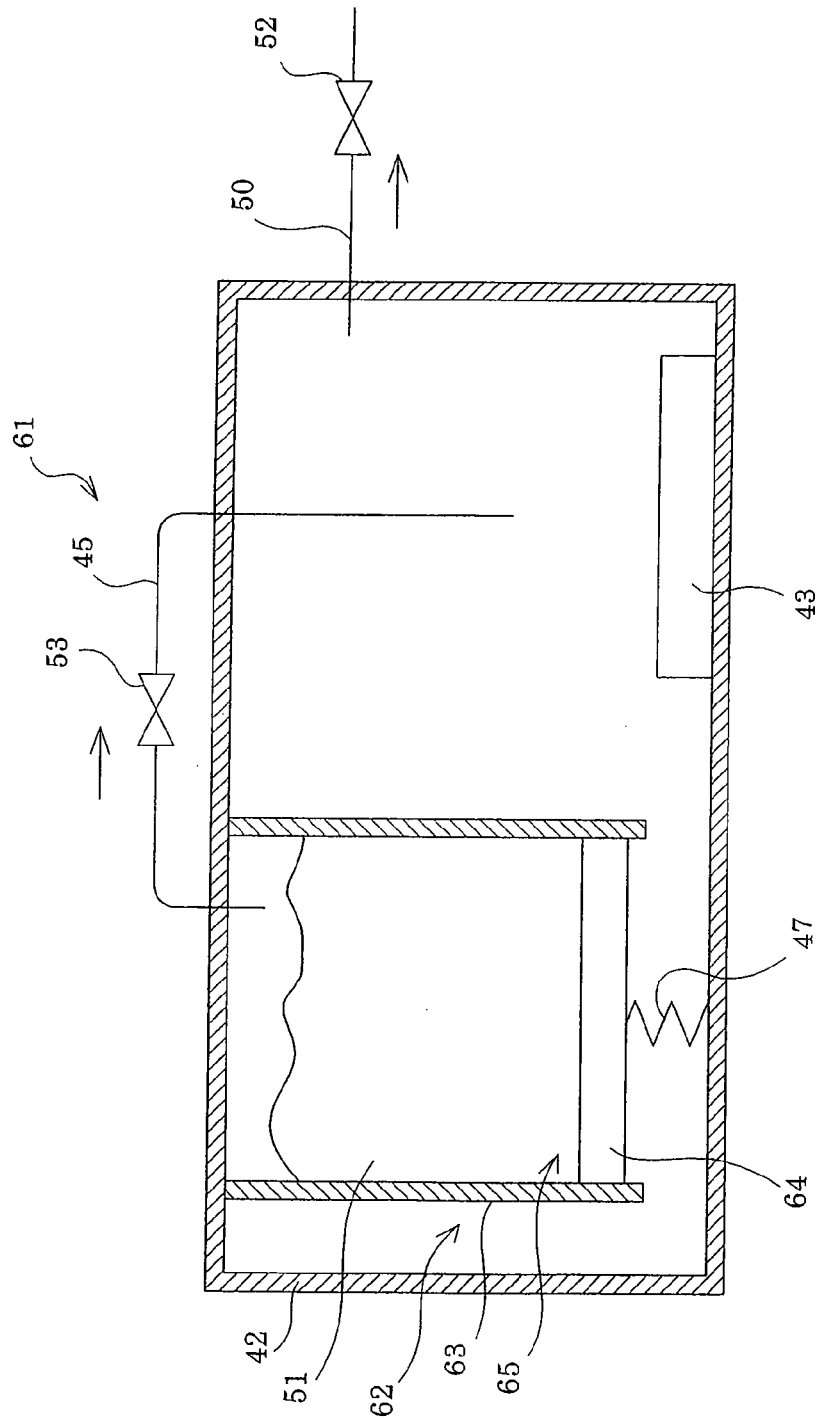
[FIG. 18] A schematic configuration drawing of a hydrogen generator according to a sixth embodiment of the present invention.

FIG. 16 shows the schematic configuration of a hydrogen generator according to a fourth embodiment of the present invention. FIG. 17 shows the schematic configuration of a hydrogen generator according to a fifth embodiment of the present invention. FIG. 18 shows the schematic configuration of a hydrogen generator according to a sixth embodiment of the present invention.

The hydrogen generator according to the fourth embodiment will be described based on FIG. 16.

A hydrogen generator 41 is equipped with a reaction chamber 42, and a workpiece 43 is stored in the reaction chamber 42. A solution container 44 is provided inside the reaction chamber 42, and a reaction solution 51, which is a reaction fluid, is stored in the solution container 44. The reaction chamber 42 and the solution container 44 are connected by a liquid feed pipe 45 as a fluid supply path. The liquid feed pipe 45 connects the reaction chamber 42 and the solution container 44 together by way of the outside of the reaction chamber 42.

The solution container 44 comprises a bag member formed, for example, of polypropylene (flexible material: a film or a sheet-shaped material of resin or rubber), and has a weighting plate 46 as a plate material provided at the bottom thereof. A compression spring 47 is provided between the weighting plate 46 and the bottom wall of the reaction chamber 42, and the weighting plate 46 is urged by the compression spring 47. As the solution container 44, a flexible material, such as PET, silicone, silicone rubber, butyl rubber, or isoprene rubber, can be applied in addition to polypropylene.

The solution container 44 is always pressed via the compression spring 47 and the weighting plate 46. Thus, under conditions where the reaction solution 51 flows through the liquid feed pipe 45, the reaction solution 51 can be pushed out of the solution container 44. When the reaction solution 51 is pushed out, the bag member is deformed, and the volume of the solution container 44 is decreased, because the solution container 44 is pressed via the weighting plate 46. Thus, the capacity of the reaction chamber 42 is increased correspondingly. When the reaction solution 51 is sent to the reaction chamber 42 through the liquid feed pipe 45, the reaction solution 51 and the workpiece 43 contact to cause a hydrogen generation reaction in the reaction chamber 42 whose capacity has increased.

A hydrogen conduit 50 is connected to the reaction chamber 42, and a regulator 52 is provided in the hydrogen conduit 50. The amount of hydrogen discharge from the reaction chamber 42 is regulated by the regulator 52. Although it is designed that the amount of hydrogen discharge can be controlled by the regulator 52, it is possible to discharge hydrogen at a constant hydrogen pressure with the use of a constant pressure valve.

A pressure regulating valve 53 for pressure regulation is installed in the liquid feed pipe 45 at a site outside of the reaction chamber 42, and the pressure regulating valve 53 is a valve for regulating the pressure when the reaction solution 51 is allowed to flow. The output pressure when the reaction solution 51 is allowed to flow is the pressure during opening of the pressure regulating valve 53 (valve opening pressure). When the pressure inside the reaction chamber 42 exceeds the valve opening pressure, the pressure regulating valve 53 closes. When the pressure inside the reaction chamber 42 becomes lower than the valve opening pressure (falls to a predetermined value or lower), the pressure regulating valve 13 opens.

That is, the internal pressure of the solution container 44 is kept at a value higher than the pressure for opening of the pressure regulating valve 53 (is kept at a pressure adapted to open the pressure regulating valve 53 and exceeding the predetermined pressure value of the reaction chamber 42) as a result of pressurization. The pressure regulating valve 53 is designed such that in a constant pressure state where the internal pressure of the reaction chamber 42 falls to the predetermined value or lower, the valve body opens to permit the passage of the reaction solution 51 from the solution container 44 to the reaction chamber 42.

The pressure regulating valve 53 is, for example, a constant pressure valve, and is composed of a primary channel which is a channel on the side of the solution container 44, a secondary channel which is a channel on the side of the reaction chamber 42, the valve body provided between the primary channel and the secondary channel, an external pressure transmission path for transmitting the pressure of the outside to the valve, and an internal pressure transmission path for transmitting the internal pressure of the reaction chamber 42 to the valve body.

As noted above, the reaction chamber 42 and the solution container 44 are connected by the liquid feed pipe 45 by way of the outside of the reaction chamber 42. However, the liquid feed pipe 45 can be disposed inside the reaction chamber 42. Moreover, a check valve can be provided in a nozzle portion of the liquid feed pipe 45 opening into the reaction chamber 42. By providing the check valve, backflow of hydrogen generated in the reaction chamber 42, or foams engulfing such hydrogen can be prevented. This decreases limitations on the posture of the hydrogen generator 41 when in use.

The actions of the above-described hydrogen generator 41 will be described.

The reaction solution 51 is fed from the solution container 44 to the reaction chamber 42 through the liquid feed pipe 45. In addition to the pressurization of the solution container 44, the internal pressure of the reaction chamber 42 in the absence of hydrogen generation is rendered so low as to open the pressure regulating valve 53. Thus, the reaction solution 51 is fed through the liquid feed pipe 45.

Upon feeding of the reaction solution 51 to the reaction chamber 42, the reaction solution 51 and the workpiece 43 contact and react to generate hydrogen. Once hydrogen is generated, the internal pressure of the reaction chamber 42 rises, and exceeds the valve opening pressure of the pressure regulating valve 53 (brings the pressure regulating valve 53 to closure). Upon elevation of the internal pressure of the reaction chamber 42, the pressure regulating valve 53 enters into a closed state to stop the supply of the reaction solution 51 through the liquid feed pipe 45.

When the reaction solution 51 is not supplied any more, the reaction rate of the hydrogen generation reaction in the reaction chamber 42 lowers, and generated hydrogen is discharged through the hydrogen conduit 50 of the reaction chamber 42. Since the internal pressure of the reaction chamber 42 lowers, it becomes such a low pressure that the pressure regulating valve 53 is opened. As a result, the reaction solution 51 is fed again from the solution container 44 to the reaction chamber 42, whereby the reaction solution 51 and the workpiece 43 contact to generate hydrogen.

Here, a pressing means is used to feed the reaction solution 51 from the solution container 44. That is, the weighting plate 46 is urged by the compression spring 47 to deform the bag member into a state where the volume of the solution container 44 is decreased. At the same time, the reaction solution 51 is pressurized, and fed by the pressing force. The reaction solution 51 is always subject to the force, with which it is discharged from the solution container 44, by pressurization resulting from the deformation (volume decrease) of the solution container 44 by means of the compression spring 47 via the weighting plate 46. However, the pressure changes according to the amount of displacement of the compression spring 47.

In connection with the change in the discharge speed of the reaction solution 51, there is the pressure regulating valve 53 which is open owing to a decrease in the internal pressure of the reaction solution 51, and whose valve opening pressure is constant. Thus, the discharge speed of the reaction solution 51 is constant, regardless of the pressure of the solution container 44. Furthermore, the pressure regulating valve 53 is opened and closed depending on the relationship between the internal pressure and the external pressure of the reaction chamber 42. Since the external pressure (concretely, atmospheric pressure) is constant, the internal pressure of the reaction chamber 42 is kept nearly constant.

Hence, the reaction solution 51 can be stably supplied to the reaction chamber 42 in accordance with the pressure state without use of power, whereby hydrogen can be generated. By urging the weighting plate 46 to vary the volume of the solution container 44, the solution container 44 is pressurized, whereby a pressure state permitting the pressure regulating valve 53 to open can be retained. Moreover, the weighting plate 46 is pressed by the urging force of the compression spring 47. Thus, a very simple configuration enables the weighting plate 46 to be pressed.

As the reaction solution 51 of the solution container 44 is supplied to the workpiece 43 of the reaction chamber 42, the weighting plate 46 is pressed by the urging force of the compression spring 47 to decrease the volume of the solution container 44. Thus, the capacity of the reaction chamber 42 can be increased by an amount corresponding to the decrease in the volume of the solution container 44. Hence, a dead space is eliminated, so that the region of hydrogen generation can be increased despite a small space, making space saving possible without reducing the amount of hydrogen generation. Furthermore, the amount of hydrogen generation can be increased without an increase in space.

Consequently, the above-described hydrogen generator 41 enables a sufficient amount of hydrogen to be generated with a small volume.

The hydrogen generator according to the fifth embodiment will be described based on FIG. 17. The same members as those shown in FIG. 16 are assigned the same numerals as in FIG. 16, and duplicate explanations are omitted.

A hydrogen generator 55 according to the fifth embodiment is equipped with a solution container 56, as a fluid chamber, within a reaction chamber 42, instead of the solution container 44 shown in FIG. 16. A reaction solution 51 (for example, an aqueous solution of malic acid) is stored in the solution container 56. The reaction chamber 42 and the solution container 56 are connected by a liquid feed pipe 45 as a fluid supply path. The liquid feed pipe 45 connects the reaction chamber 42 and the solution container 56 together by way of the outside of the reaction chamber 42.

The solution container 56 is composed of a bellows comprising a bellows member as a deformation allowing member, and comprises, for example, SUS, phosphor bronze, or beryllium. A weighting plate 57 as a plate material is provided at the bottom of the solution container 56 (end portion of the bellows member). A compression spring 47 is provided between the weighting plate 57 and the bottom wall of the reaction chamber 42, and the weighting plate 57 is urged by the compression spring 47. By pressing the solution container 56 via the weighting plate 57, the bellows shrinks to decrease the volume of the solution container 56.

The solution container 56 is always pressed via the compression spring 47 and the weighting plate 57. Thus, under conditions where the reaction solution 51 flows through the liquid feed pipe 45, the reaction solution 51 can be pushed out of the solution container 56. When the reaction solution 51 is pushed out, the bellows shrinks, and the volume of the solution container 56 decreases, because the solution container 56 is pressed via the weighting plate 57. Thus, the capacity of the reaction chamber 42 is increased correspondingly. When the reaction solution 51 is sent to the reaction chamber 42 through the liquid feed pipe 45, the reaction solution 51 and the workpiece 43 contact to cause a hydrogen generation reaction in the reaction chamber 42 whose capacity has increased.

Hence, the reaction solution 51 can be stably supplied to the reaction chamber 42 in accordance with the pressure state without use of power, whereby hydrogen can be generated. By urging the weighting plate 57 to contract the bellows, thereby varying the volume of the solution container 56, the solution container 56 is pressurized, whereby a pressure state permitting the pressure regulating valve 53 to open can be retained. As the reaction solution 51 of the solution container 56 is supplied to the workpiece 43 of the reaction chamber 42, the weighting plate 57 is pressed by the urging force of the compression spring 47 to contract the bellows, thereby decreasing the volume of the solution container 56. Thus, the capacity of the reaction chamber 42 can be increased by an amount corresponding to the decrease in the volume of the solution container 56. Hence, a dead space is eliminated, so that the region of hydrogen generation can be increased within a small space, making space saving possible without reducing the amount of hydrogen generation. Furthermore, the amount of hydrogen generation can be increased without an increase in space.

Consequently, the above-described hydrogen generator 55 enables a sufficient amount of hydrogen to be generated with a small volume.

The hydrogen generator according to the sixth embodiment will be described based on FIG. 18. The same members as those shown in FIGS. 16 and 17 are assigned the same numerals as in FIGS. 16 and 17, and duplicate explanations are omitted.

A hydrogen generator 61 according to the sixth embodiment is equipped with a solution container 62, as a fluid chamber, within a reaction chamber 42, instead of the solution container 44 shown in FIG. 16. A reaction solution 51 (for example, an aqueous solution of malic acid) is stored in the solution container 62. The reaction chamber 42 and the solution container 62 are connected by a liquid feed pipe 45 as a fluid supply path. The liquid feed pipe 45 connects the reaction chamber 42 and the solution container 62 together by way of the outside of the reaction chamber 42.

The solution container 62 is composed of a cylinder 63 having an end portion (lower end portion) opened, and a piston plate 64 movably provided on the open end side of the cylinder 63 (a so-called syringe structure). The capacity of a cylinder chamber 65 is rendered variable by the movement of the piston plate 64, and the reaction solution 51 is stored in the cylinder chamber 65. A compression spring 47 is provided between the piston plate 64 and the bottom wall of the reaction chamber 42, and the piston plate 64 is urged by the compression spring 47. By pressing the piston plate 64, the capacity of the cylinder chamber 65 of the cylinder 63 is decreased to increase the open volume of the solution container 62 and decrease the volume of the solution container 62.

The piston plate 64 of the solution container 62 is always pressed via the compression spring 47. Thus, under conditions where the reaction solution 51 flows through the liquid feed pipe 45, the reaction solution 51 can be pushed out of the cylinder chamber 65 of the solution container 62. When the reaction solution 51 is pushed out, the capacity of the cylinder chamber 65 decreases and the volume of the solution container 62 decreases, because the cylinder chamber 65 is pressed by the piston plate 64. Thus, the capacity of the reaction chamber 42 is increased correspondingly. When the reaction solution 51 is sent to the reaction chamber 42 through the liquid feed pipe 45, the reaction solution 51 and the workpiece 43 contact to cause a hydrogen generation reaction in the reaction chamber 42 whose capacity has increased.

Hence, the reaction solution 51 can be stably supplied to the reaction chamber 42 in accordance with the pressure state without use of power, whereby hydrogen can be generated. By urging the piston plate 64' to decrease the capacity of the cylinder chamber 65 and vary the volume of the solution container 62, the solution container 62 is pressurized, whereby a pressure state permitting the pressure regulating valve 53 to open can be retained.

As the reaction solution 51 of the solution container 62 is supplied to the workpiece 43 of the reaction chamber 42, the piston plate 64 is pressed by the urging force of the compression spring 47 to decrease the capacity of the cylinder chamber 65, thereby decreasing the volume of the solution container 62. Thus, the capacity of the reaction chamber 42 can be increased by an amount corresponding to the decrease in the volume of the solution container 62. Hence, a dead space is eliminated, so that the region of hydrogen generation can be increased within a small space, making space saving possible without reducing the amount of hydrogen generation. Furthermore, the amount of hydrogen generation can be increased without an increase in space.

Consequently, the above-described hydrogen generator 61 enables a sufficient amount of hydrogen to be generated with a small volume.

The fuel cell apparatus will be described based on FIGS. 19 to 21.

Figure 19:
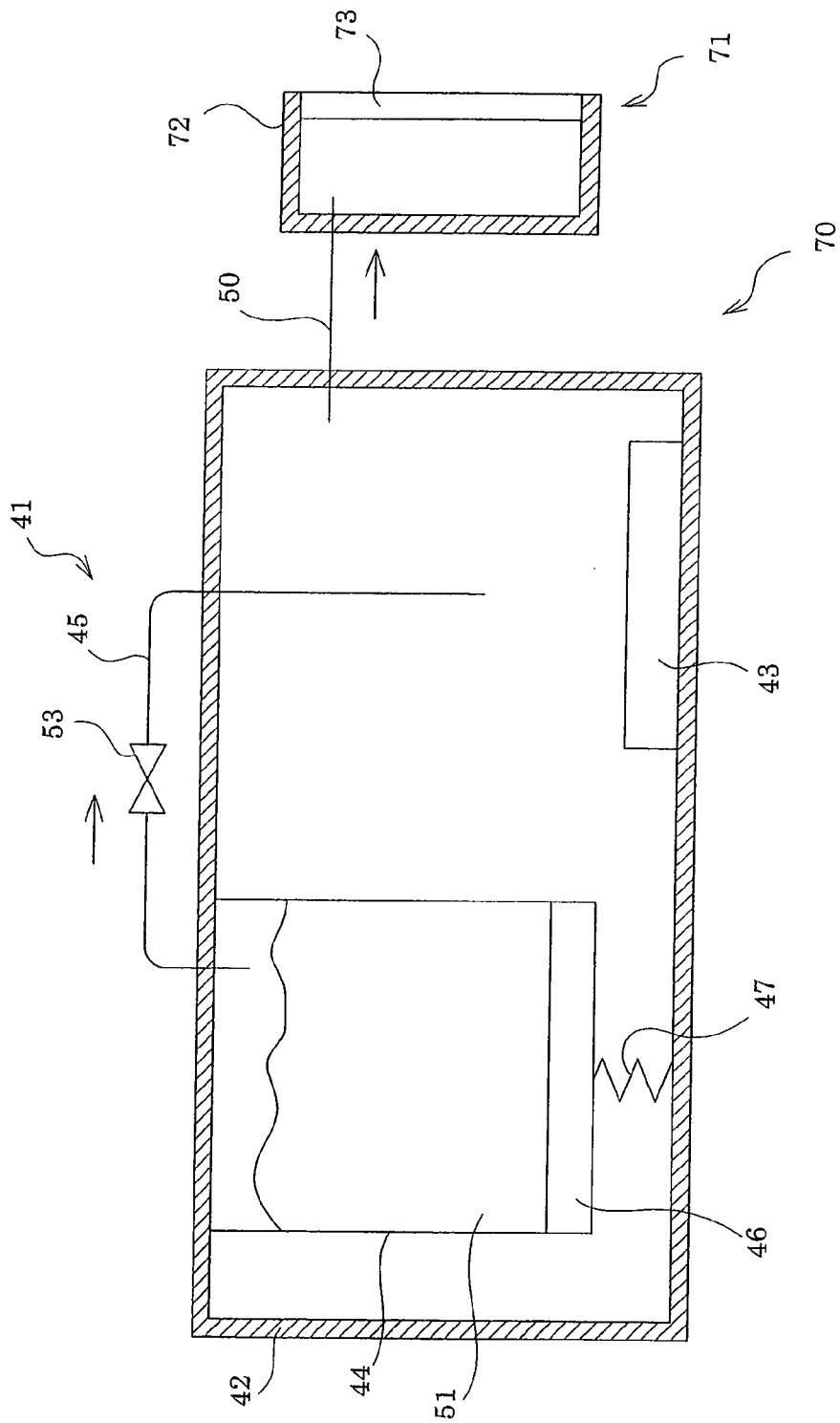
[FIG. 19] A schematic configuration drawing of a fuel cell apparatus according to a third embodiment of the present invention.

FIG. 19 shows the schematic configuration of a fuel cell apparatus according to a third embodiment of the present invention. FIG. 20 shows the schematic configuration of a fuel cell apparatus according to a fourth embodiment of the present invention. FIG. 21 show the schematic configuration of a fuel cell apparatus according to a fifth embodiment of the present invention. The same members as those shown in FIGS. 19 to 20 are assigned the same numerals as in FIGS. 19 to 20, and duplicate explanations are omitted.

A fuel cell apparatus 70 according to the third embodiment will be described.

The fuel cell apparatus 70 shown in FIG. 19 is a system in which the hydrogen generator 41 shown in FIG. 16 is connected to a fuel cell 71. That is, the fuel cell 71 is equipped with an anode chamber 72, and the anode chamber 72 constitutes a space contiguous to an anode room of a fuel cell unit cell 73. The anode room is a space for temporarily storing hydrogen to be consumed by the anode.

The anode chamber 72 and the reaction chamber 42 are connected by a hydrogen conduit 50, and hydrogen generated in the reaction chamber 42 is supplied to the anode room of the anode chamber 72. Hydrogen supplied to the anode room is consumed by the fuel cell reaction in the anode. The amount of hydrogen consumption in the anode is determined by the output current of the fuel cell 71.

The regulator 52 provided in the hydrogen conduit 50 shown in FIG. 16 is not mounted, because it need not be installed. Instead of the hydrogen generator 41, it is possible to apply the hydrogen generator 55 shown in FIG. 17 or the hydrogen generator 61 shown in FIG. 18.

The above-mentioned fuel cell apparatus 70 can be configured as the fuel cell apparatus 70 equipped with the hydrogen generator 41 which can generate a sufficient amount of hydrogen with a small volume.

A fuel cell apparatus 81 according to the fourth embodiment will be described.

Figure 20:
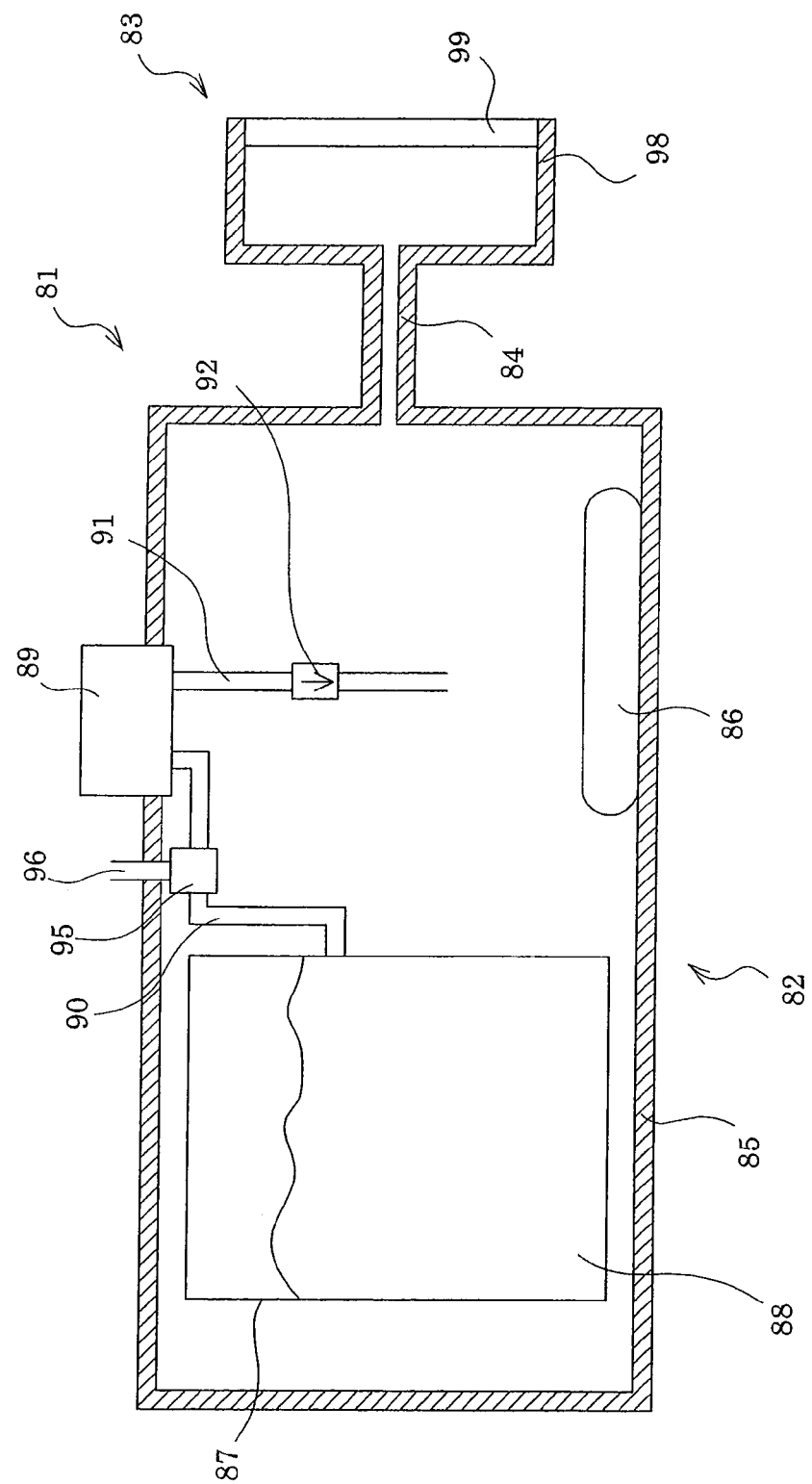
[FIG. 20] A schematic configuration drawing of a fuel cell apparatus according to a fourth embodiment of the present invention.

The fuel cell apparatus 81 shown in FIG. 20 is composed of a hydrogen generator 82 and a fuel cell 83. The hydrogen generator 82 and the fuel cell 83 are connected by a hydrogen conduit 84.

The hydrogen generator 82 will be described.

The hydrogen generator 82 is equipped with a reaction chamber 85 as a reactant vessel, and a workpiece 86 (e.g., sodium borohydride) as a hydrogen generation reactant is stored in the reaction chamber 85. A solution container 87 as a fluid chamber is provided inside the reaction chamber 85, and a reaction solution (e.g., an aqueous solution of malic acid), which is a reaction fluid, is stored in the solution container 87.

A temporary reservoir 89 is provided in the exterior of the reaction chamber 85, and the solution container 87 and the temporary reservoir 89 are connected by a supply pipe 90. A pressure regulating valve 95 is provided in the supply pipe 90, and when the pressure from the supply pipe 90 reaches a predetermined pressure or higher, the pressure regulating valve 95 opens to send the reaction solution 88 to the temporary reservoir 89. In the drawing, the numeral 96 an air intake through which the air is taken in for the opening and closing actions of the pressure regulating valve 95.

A discharge pipe 91 opening into the reaction chamber 85 is connected to the temporary reservoir 89, and a check valve 92 is provided in the discharge pipe 91. By the action of the check valve 92, the reaction solution 88 from the temporary reservoir 89 is allowed to pass through the discharge pipe 91, and the backflow of the reaction solution 88 from the reaction chamber 85 is prevented. When the reaction solution 88 is fed to the reaction chamber 85 through the discharge pipe 91, the reaction solution 88 and the workpiece 86 contact to cause a hydrogen generation reaction in the reaction chamber 852.

The solution container 87 is a container as a bag-shaped member comprising a flexible film (e.g., polypropylene). Upon feeding of the reaction solution 88 to the temporary reservoir 89, and upon pressurization by hydrogen generated in the reaction chamber 85, the volume of the solution container 87 is decreased. That is, as the reaction solution 88 is supplied from the solution container 87 to the reaction chamber 85, the volume of the solution container 87 is decreased, and the capacity of the reaction chamber 85 is increased correspondingly.

The fuel cell 83 will be described.

The fuel cell 83 is equipped with an anode chamber 98, and the anode chamber 98 constitutes a space contiguous to an anode room of a fuel cell unit cell 99. The anode room is a space for temporarily holding, hydrogen to be consumed by the anode. The anode chamber 98 and the reaction chamber 85 are connected by a hydrogen conduit 84, and hydrogen generated in the reaction chamber 85 is supplied to the anode room of the anode chamber 98. Hydrogen supplied to the anode room is consumed by the fuel cell reaction in the anode. The amount of hydrogen consumption in the anode is determined by the output current of the fuel cell 83.

The actions of the above-mentioned fuel cell apparatus 81 will be described.

When the fuel cell unit cell 99 is connected to a load, hydrogen inside the fuel cell apparatus 81 and oxygen in air cause a fuel cell reaction to generate electric power. Since power generation proceeds while consuming hydrogen, the internal pressure of the anode chamber 98, the hydrogen conduit 84, and the reaction chamber 85 falls. Here, the temporary reservoir 89 is subjected to atmospheric pressure. If the internal pressure becomes lower than atmospheric pressure, therefore, a differential pressure arises between the temporary reservoir 89 and the reaction chamber 85. As a result, the reaction solution 88 (aqueous malic acid solution) stored in the temporary reservoir 89 passes through the discharge pipe 91 and moves into the reaction chamber 85.

When the reaction solution 88 moves into the reaction chamber 85, the reaction solution 88 contacts the workpiece 86 (sodium borohydride) to cause a hydrogen generation reaction. Hydrogen generated passes through the hydrogen conduit 84, and is supplied to the anode chamber 98. Because of hydrogen generation, the internal pressure of the reaction chamber 85, the hydrogen conduit 84, and the anode chamber 98 exceeds atmospheric pressure, with the result that the internal pressure of the reaction chamber 85 becomes higher than the pressure of the temporary reservoir 89. Thus, hydrogen is about to flow backward through the discharge pipe 91, but this backflow is prevented by the check valve 92.

On the other hand, the solution container 87 is compressed under the internal pressure of the reaction chamber 85, whereby the reaction solution 88 stored within the solution container 87 is moved to the pressure regulating valve 95 through the supply pipe 90. The pressure regulating valve 95 is subjected to the pressure of the reaction solution 88, for example, at 10 kPa (gauge pressure) in the valve closing direction. When the internal pressure of the reaction chamber 85 exceeds 10 kPa (gauge pressure), the force in the valve opening direction surpasses the force in the valve closing direction under the pressure of the reaction solution 88. Thus, the pressure regulating valve 95 opens to supply the reaction solution 88 to the temporary reservoir 89.

Then, the rate of hydrogen generation lowers, and the rate of hydrogen consumption in the fuel cell 83 surpasses it, whereupon the internal pressure of the anode chamber 98, the hydrogen conduit 84, and the reaction chamber 85 begins to lower. While the internal pressure remains higher than 10 kPa (gauge pressure), the pressure regulating valve 95 is open, so that the reaction solution 88 flows from the temporary reservoir 89 into the solution container 87. When the internal pressure becomes lower than 10 kPa (gauge pressure), the pressure regulating valve 95 is closed. The internal pressure of the temporary reservoir 89 at this time is rendered 10 kPa (gauge pressure). If the internal pressure of the reaction chamber 85 further lowers, a pressure difference occurs between the temporary reservoir 89 and the reaction chamber 85. As a result, the check valve 92 opens, and the reaction solution 88 passes through the discharge pipe 91, moving to the reaction chamber 85. Thus, the reaction solution 88 contacts the workpiece 86 to cause a hydrogen generation reaction, raising the internal pressure of the reaction chamber 85 again.

In accordance with the repetition of the above procedure, hydrogen is generated, and hydrogen as a fuel is supplied to the anode chamber 98 of the fuel cell 83.

As the reaction solution 88 is supplied from the solution container 87 to the reaction chamber 85, the volume of the solution container 87 is decreased, and the capacity of the reaction chamber 85 is increased correspondingly. Hence, a dead space is eliminated, so that the region of hydrogen generation can be increased within a small space, making space saving possible without reducing the amount of hydrogen generation. Furthermore, the amount of hydrogen generation can be increased without an increase in space.

The above-mentioned fuel cell apparatus 81 can be configured as the fuel cell apparatus 81 equipped with the hydrogen generator 82 which can generate a sufficient amount of hydrogen with a small volume.

A fuel cell apparatus 101 according to the fifth embodiment will be described.

Figure 21:
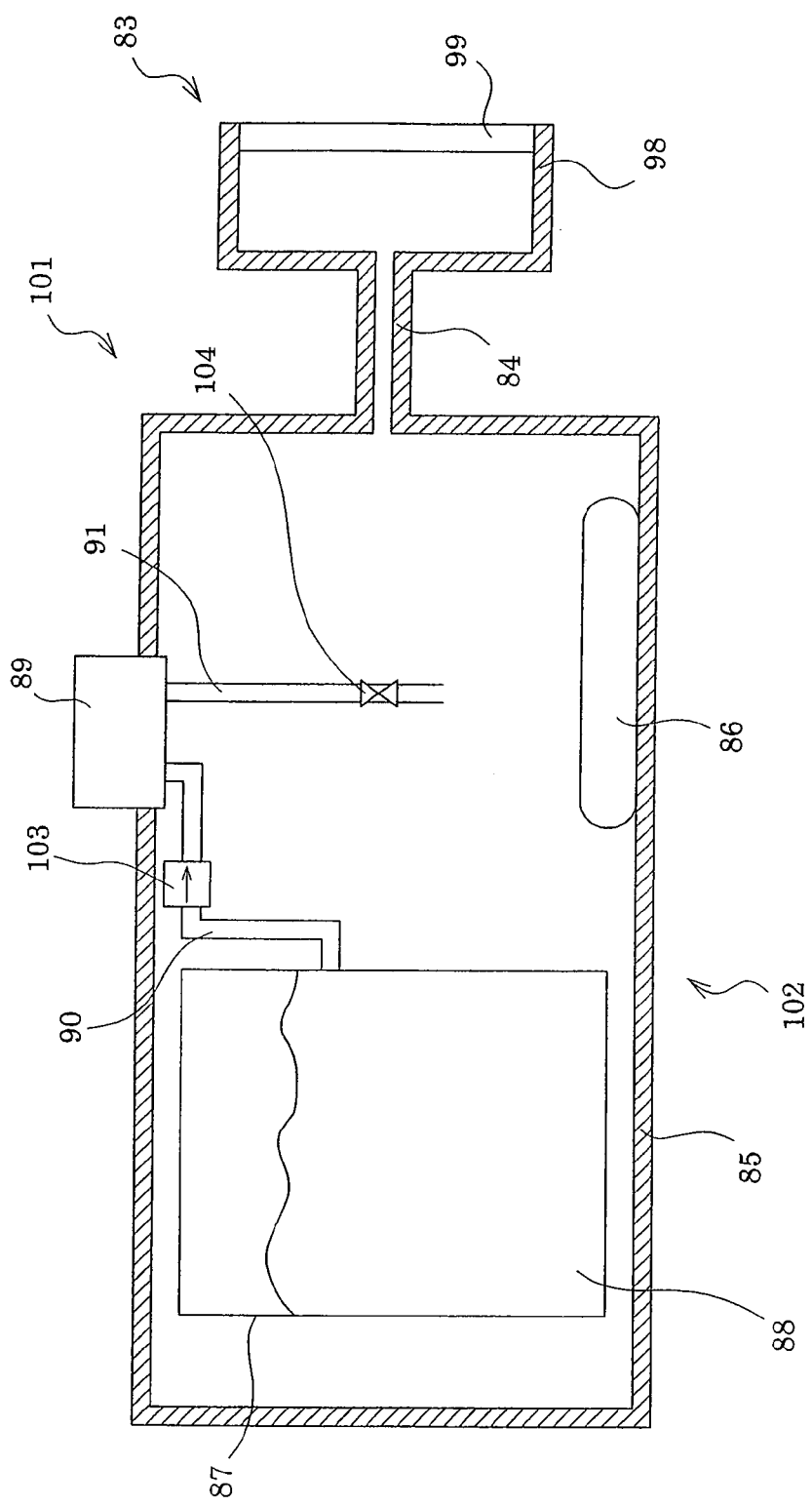
[FIG. 21] A schematic configuration drawing of a fuel cell apparatus according to a fifth embodiment of the present invention.

The fuel cell apparatus 101 shown in FIG. 21 is composed of a hydrogen generator 102 and a fuel cell 83. The hydrogen generator 102 and the fuel cell 83 are connected by a hydrogen conduit 84.

The hydrogen generator 102 will be described.

The hydrogen generator 102 is equipped with a reaction chamber 85 as a reactant vessel, and a workpiece 86 (e.g., sodium borohydride) as a hydrogen generation reactant is stored in the reaction chamber 85. A solution container 87 as a fluid chamber is provided inside the reaction chamber 85, and a reaction solution (e.g., an aqueous solution of malic acid), which is a reaction fluid, is stored in the solution container 87.

A temporary reservoir 89 is provided in the exterior of the reaction chamber 85, and the solution container 87 and the temporary reservoir 89 are connected by a supply pipe 90. A check valve 103 is provided in the supply pipe 90. By the action of the check valve 93, the reaction solution 88 from the solution container 87 is allowed to pass through the supply pipe 90, and the backflow of the reaction solution 88 from the temporary reservoir 89 is prevented. The solution container 87 is pressurized by hydrogen generated in the reaction chamber 85, and when the pressure from the supply pipe 90 reaches the pressure of the temporary reservoir 89 or higher, the reaction solution 88 is sent to the temporary reservoir 89.

A discharge pipe 91 opening into the reaction chamber 85 is connected to the temporary reservoir 89, and a pressure regulating valve 104 is provided in the discharge pipe 91. When the internal pressure of the reaction chamber 85 falls to a predetermined pressure or lower, the pressure regulating valve 104 opens to enable the reaction solution 88 from the temporary reservoir 89 to pass through the discharge pipe 91. The internal pressure of the temporary reservoir 89 is raised by the reaction solution 88 to be brought to a state higher than the pressure at which the pressure regulating valve opens (i.e., to a pressure exceeding the predetermined pressure value of the reaction chamber 85 for permitting the pressure regulating valve 104 to open). In accordance with the difference in internal pressure between the temporary reservoir 89 and the reaction chamber 85, the reaction solution 88 is fed to the reaction chamber 85 through the discharge pipe 91. As a result, the reaction solution 88 and the workpiece 86 contact to cause a hydrogen generation reaction in the reaction chamber 85.

The solution container 87 is a container as a bag-shaped member comprising a flexible film (e.g., polypropylene). Upon feeding of the reaction solution 88 to the temporary reservoir 89, and upon pressurization by hydrogen generated in the reaction chamber 85, the volume of the solution container 87 is decreased. That is, as the reaction solution 88 is supplied from the solution container 87 to the reaction chamber 85, the volume of the solution container 87 is decreased, and the capacity of the reaction chamber 85 is increased correspondingly.

The actions of the above-mentioned fuel cell apparatus 101 will be described.

When the fuel cell unit cell 99 is connected to a load, hydrogen inside the fuel cell 83 and oxygen in air cause a fuel cell reaction to generate electric power. Since power generation proceeds while consuming hydrogen, the internal pressure of the anode chamber 98, the hydrogen conduit 84, and the reaction chamber 85 falls. Here, the temporary reservoir 89 is subjected to atmospheric pressure. If the internal pressure becomes lower than atmospheric pressure, therefore, a differential pressure arises between the temporary reservoir 89 and the reaction chamber 85. As a result, the reaction solution 88 (aqueous malic acid solution) stored in the temporary reservoir 89 passes through the discharge pipe 91 and moves into the reaction chamber 85.

When the reaction solution 88 moves to the reaction chamber 85, the reaction solution 88 contacts the workpiece 86 (sodium borohydride) to cause a hydrogen generation reaction. Hydrogen generated passes through the hydrogen conduit 84, and is supplied to the anode chamber 98. Because of hydrogen generation, the internal pressure of the reaction chamber 85, the hydrogen conduit 84, and the anode chamber 98 exceeds atmospheric pressure, with the result that the internal pressure of the reaction chamber 85 becomes higher than the pressure of the temporary reservoir 89. Thus, hydrogen is about to flow backward through the discharge pipe 91, but this backflow is prevented by the pressure regulating valve 104.

On the other hand, the solution container 87 is compressed under the internal pressure of the reaction chamber 85, whereby the reaction solution 88 stored within the solution container 87 is passed through the supply pipe 90 and the check valve 103, and supplied to the temporary reservoir 89.

Then, the rate of hydrogen generation lowers, and the rate of hydrogen consumption in the fuel cell 83 surpasses the rate of hydrogen generation, whereupon the internal pressure of the anode chamber 98, the hydrogen conduit 84, and the reaction chamber 85 begins to lower. When the internal pressure lowers, and a pressure difference occurs between the temporary reservoir 89 and the reaction chamber 85, the pressure regulating valve 104 opens to flow the reaction solution 88 from the temporary reservoir 89 to the solution container 87. As a result, the reaction solution 88 contacts the workpiece 86 to cause a hydrogen generation reaction, raising the internal pressure of the reaction chamber 85 again.

In accordance with the repetition of the above procedure, hydrogen is generated, and hydrogen as a fuel is supplied to the anode chamber 98 of the fuel cell 83.

As the reaction solution 88 is supplied from the solution container 87 to the reaction chamber 85, the volume of the solution container 87 is decreased, and the capacity of the reaction chamber 85 is increased correspondingly. Hence, a dead space is eliminated, so that the region of hydrogen generation can be increased within a small space, making space saving possible without reducing the amount of hydrogen generation. Furthermore, the amount of hydrogen generation can be increased without an increase in space.

The above-mentioned fuel cell apparatus 101 can be configured as the fuel cell apparatus 101 equipped with the hydrogen generator 102 which can generate a sufficient amount of hydrogen with a small volume.

According to the present embodiments, as described above, it is possible to provide a method of hydrogen generation and a hydrogen generator which permit uniform and efficient contact between the complex hydride and the catalyst, can generate hydrogen at the required rate, and impart a high reaction efficiency and a high hydrogen storage density.

According to the present embodiments, moreover, it is possible to provide a fuel cell apparatus equipped with a hydrogen generator which permits uniform and efficient contact between the complex hydride and the catalyst, can generate hydrogen at the required rate, and imparts a high reaction efficiency and a high hydrogen storage density.

Industrial Applicability

The present invention can be utilized, for example, in the industrial field of hydrogen generators which decompose metal hydrides to generate hydrogen.

We claim:

1. A hydrogen generator comprising:
    a reaction chamber that contains a complex hydride capable of reacting with an aqueous acid solution to generate hydrogen;
    a storage chamber that contains an aqueous acid solution that is supplied through a supply pipe to the reaction chamber to react with the complex hydride to generate hydrogen, the total weight of water contained in the aqueous acid solution being 0.2 times or more, but 3 times or less, than the weight of the complex hydride; and
    a control device that controls the supplying of the aqueous acid solution through the supply pipe to the reaction chamber based on a reference pressure such that the aqueous acid solution is repeatedly supplied to the reaction chamber when the reference pressure is greater than the internal pressure within the reaction chamber and not supplied to the reaction chamber when the reference pressure is less than the internal pressure within the reaction chamber.

2. A hydrogen generator according to claim 1; wherein the reference pressure is atmospheric pressure.

3. A hydrogen generator according to claim 1; wherein the control device comprises a check valve that is disposed in the supply pipe and that opens and closes in response to a differential pressure between the storage chamber and the reaction chamber, the check valve opening when the internal pressure within the reaction chamber becomes lower than the reference pressure to permit flow of the aqueous acid solution to the reaction chamber and closing when the internal pressure within the reaction chamber becomes higher than the reference pressure to prevent flow of the aqueous acid solution to the reaction chamber.

4. A hydrogen generator according to claim 3; further including means for continually maintaining the aqueous acid solution in the storage chamber under pressure.

5. A hydrogen generator according to claim 1; wherein the control device comprises a pressure regulating valve that is disposed in the supply pipe and that opens and closes in response to a differential pressure between the storage chamber and the reaction chamber, the pressure regulating valve opening when the internal pressure within the reaction chamber becomes lower than the reference pressure to permit flow of the aqueous acid solution to the reaction chamber and closing when the internal pressure within the reaction chamber becomes higher than the reference pressure to prevent flow of the aqueous acid solution to the reaction chamber.

6. A hydrogen generator according to claim 5; further including means for continually maintaining the aqueous acid solution in the storage chamber under pressure.

7. A fuel cell apparatus, comprising:
    a fuel cell having a negative electrode chamber; and
    a hydrogen generator according to claim 1, wherein the reaction chamber is connected by a hydrogen supply pipe to the negative electrode chamber to supply hydrogen from the reaction chamber to the negative electrode chamber.

8. A fuel cell apparatus according to claim 7; wherein the reference pressure is equal to the sum of a set hydrogen pressure of the fuel cell and a pressure loss of the hydrogen during its flow through the hydrogen supply pipe.

9. A hydrogen generator according to claim 1; wherein the aqueous acid solution contains malic acid and the complex hydride comprises sodium borohydride.

10. A hydrogen generator according to claim 1; wherein the aqueous acid solution contains a carboxylic acid.

11. A hydrogen generator comprising:
    a reaction chamber that contains a complex hydride capable of reacting with an aqueous acid accelerator solution to generate hydrogen;
    a storage chamber that contains an aqueous acid accelerator solution that is supplied to the reaction chamber to react with the complex hydride to generate hydrogen; and
    a control device that controls the supplying of the aqueous acid accelerator solution from the storage chamber to the reaction chamber based on a reference pressure such that the aqueous acid accelerator solution is repeatedly supplied to the reaction chamber when the reference pressure is greater than the internal pressure within the reaction chamber and not supplied to the reaction chamber when the reference pressure is less than the internal pressure within the reaction chamber.

12. A hydrogen generator according to claim 11; wherein a total weight of water contained in the aqueous acid accelerator solution is 0.2 times or more, but 3 times or less, than the weight of the complex hydride.

13. A hydrogen generator according to claim 11; wherein the reference pressure is atmospheric pressure.

14. A hydrogen generator according to claim 11; wherein the control device comprises a check valve that opens and closes in response to a differential pressure between the storage chamber and the reaction chamber, the check valve opening when the internal pressure within the reaction chamber becomes lower than the reference pressure to permit flow of the aqueous acid accelerator solution to the reaction chamber and closing when the internal pressure within the reaction chamber becomes higher than the reference pressure to prevent flow of the aqueous acid accelerator solution to the reaction chamber.

15. A hydrogen generator according to claim 14; further including means for continually maintaining the aqueous acid accelerator solution in the storage chamber under pressure.

16. A hydrogen generator according to claim 11; wherein the control device comprises a pressure regulating valve that opens and closes in response to a differential pressure between the storage chamber and the reaction chamber, the pressure regulating valve opening when the internal pressure within the reaction chamber becomes lower than the reference pressure to permit flow of the aqueous acid accelerator solution to the reaction chamber and closing when the internal pressure within the reaction chamber becomes higher than the reference pressure to prevent flow of the aqueous acid accelerator solution to the reaction chamber.

17. A hydrogen generator according to claim 16; further including means for continually maintaining the aqueous acid accelerator solution in the storage chamber under pressure.

18. A fuel cell apparatus comprising:
a fuel cell having a negative electrode chamber; and
a hydrogen generator according to claim 11, wherein the reaction chamber is connected by a hydrogen supply pipe to the negative electrode chamber to supply hydrogen from the reaction chamber to the negative electrode chamber.

* * * * *